United States Patent
Chen et al.

(10) Patent No.: US 8,157,549 B2
(45) Date of Patent: Apr. 17, 2012

(54) MULTI-CHANNEL FLUID CONVEYING APPARATUS

(75) Inventors: Shih Chang Chen, Hsin-Chu (TW); Chiang Ho Cheng, Hsin-Chu (TW); Ying Lun Chang, Hsin-Chu (TW); Rong Ho Yu, Hsin-Chu (TW); Shih Che Chiu, Hsin-Chu (TW)

(73) Assignee: Microjet Technology Co., Ltd., Hsin-Chu (TW)

( * ) Notice: Subject to any disclaimer, the term of this patent is extended or adjusted under 35 U.S.C. 154(b) by 687 days.

(21) Appl. No.: 12/379,563

(22) Filed: Feb. 25, 2009

(65) Prior Publication Data
US 2009/0217994 A1 Sep. 3, 2009

(30) Foreign Application Priority Data

Feb. 26, 2008 (CN) .......................... 2008 1 0082545
Apr. 24, 2008 (CN) .......................... 2008 1 0096032

(51) Int. Cl.
*F16K 11/02* (2006.01)
(52) U.S. Cl. ....................................................... 417/571
(58) Field of Classification Search ............... 417/413.1, 417/413.12, 412, 417, 559, 560, 571, 569
See application file for complete search history.

(56) References Cited

FOREIGN PATENT DOCUMENTS
CN 864441 11/2011

*Primary Examiner* — Karabi Guharay
*Assistant Examiner* — Elmito Breval
(74) *Attorney, Agent, or Firm* — Bacon & Thomas, PLLC

(57) ABSTRACT

A multi-channel fluid conveying apparatus, for delivering a fluid, includes a valve seat, a valve cover, a valve membrane, a plurality of temporary-deposit chambers, and an actuating device. The valve seat includes at least one inlet channel and at least one outlet channel. The valve cover is arranged on the valve seat. The valve membrane is interposed between the valve seat and the valve cover and includes a plurality of valve structures made of the same material with the same thickness, wherein at least one of the valve structures has a rigidity different from those of other valve structures. The plurality of temporary-deposit chambers is interposed between the valve membrane and the valve cover and between the valve membrane and the valve seat. The actuating device is, having a periphery, fixed to the valve cover.

15 Claims, 30 Drawing Sheets

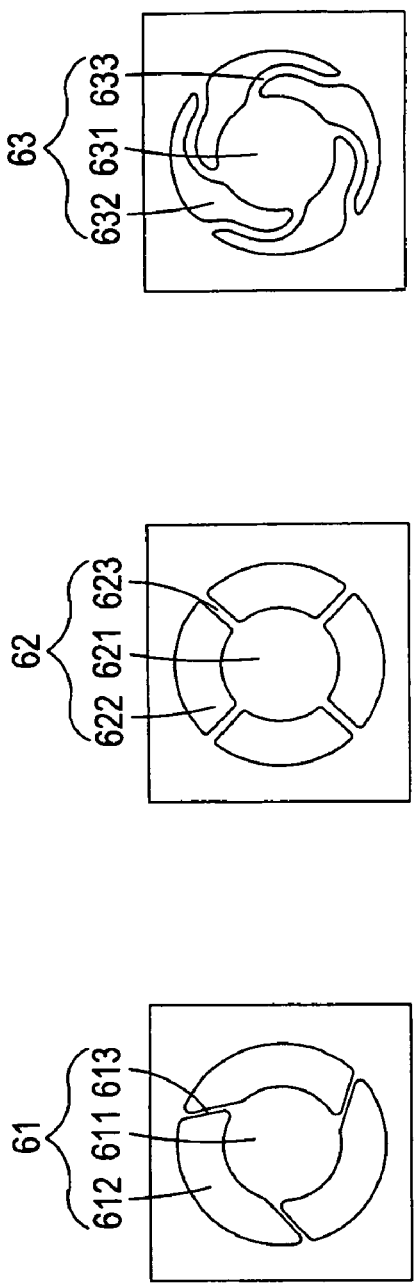
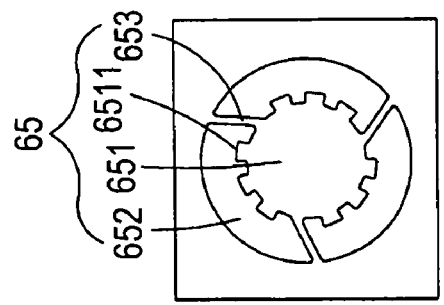
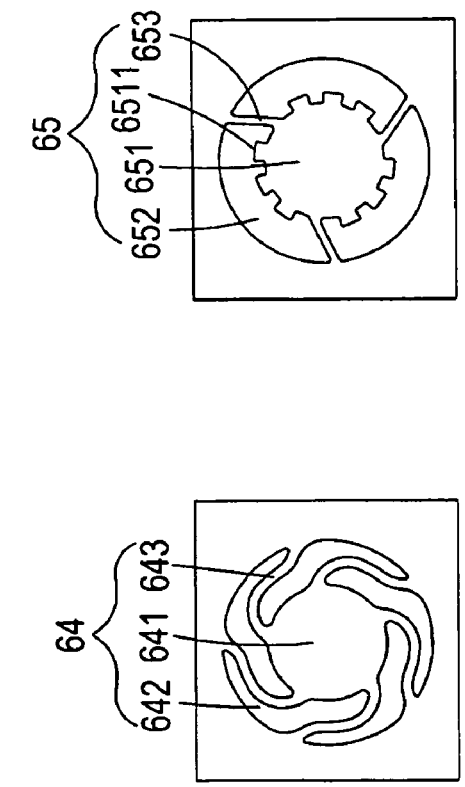
FIG. 6(a) FIG. 6(b) FIG. 6(c) FIG. 6(d) FIG. 6(e)

MULTI-CHANNEL FLUID CONVEYING APPARATUS

BACKGROUND OF THE INVENTION

1. Field of the Invention

The present invention relates to a fluid conveying device, and more particularly, to a multi-channel fluid conveying apparatus employed as a micropump structure.

2. Description of Related Art

Currently in various fields, whether in medicine, computer technology, printer, or energy, product development toward compact-sized or micro-sized becomes a trend. As far as micropumps, sprayers, ink-jet printheads, or industrial printing devices are concerned, a fluid conveying structure involved therein is considered a key technique. Therefore, how to breakthrough technological bottlenecks by a creative structure turns out to be a significant issue of developments.

Referring to FIG. 1, an exploded view illustrating a conventional micropump structure, the micropump structure 10 comprises a valve seat 11, a valve cover 12, a valve membrane 13, a micro-actuator 14, and a pump cover 15. The valve membrane 13 includes an inlet valve structure 131 and an outlet valve structure 132. The valve seat 11 includes an inlet channel 111 and an outlet channel 112. A pressure chamber 123 is defined by and between the valve cover 12 and the micro-actuator 14. The valve membrane 13 is interposed between the valve seat 11 and the valve cover 12.

Upon a voltage acting on two poles located at top and bottom of the micro-actuator 14, an electric field will be effected to bend the micro-actuator 14. When the micro-actuator 14 deforms and bends upward to a direction X, an increased volume will occur in the pressure chamber 123, so that a suction force is produced and the inlet valve structure 131 of the valve membrane 13 opened. This will make a fluid be sucked from the inlet channel 111 of the valve seat 11, and flow through the inlet valve structure 131 of the valve membrane 13 and an inlet valve channel 121 of the valve cover 12, and into the pressure membrane 13. If, however, to the contrary, when the micro-actuator 14 bends toward a direction opposite to the direction X due to a change of the electric field, the volume in the pressure chamber 123 will be compressed, such that a thrust will occur against the fluid inside the pressure chamber 123. This will make the inlet valve structure 131 and the outlet valve structure 132 of the pressure membrane 13 subject to downward thrust, such that the outlet valve structure 132 is opened and that the fluid flows from the pressure chamber 123, and through an outlet valve channel 122 of the valve cover 12, the outlet valve structure 132 of the pressure membrane 13, and the outlet channel 112 of the valve seat 11, and out of the micropump structure 10. This will complete a fluid conveying process.

In spite of the fact that the conventional micropump structure can still achieve the purpose of fluid conveyance, it adopts such a design that the mono-pressure chamber is incorporated with the mono-flow conduit, the mono-inlet and outlet, and the mono-paired valve structure. In case the conventional micropump structure 10 is employed to mix two different fluids at different proportions, two extra pumps are necessary, with first picking up different proportions of the fluids and then agitating and mixing the same. Thereafter, the mixed fluids are delivered to the micro-pump structure 10 for the conveyance of the fluids, as mentioned above. Or alternatively, if only one single pump is used. This, however, needs to incorporate an externally-attached flow adjusting valve, and as a result, makes the whole pumping system more complicated.

It is understood, therefore, that to develop a multi-channel fluid conveying apparatus so as to improve the defects inherent in the conventional art becomes an urge.

SUMMARY OF THE INVENTION

The object of the present invention is to provide a multi-channel fluid conveying apparatus so as to solve the problem, as mentioned above, that in order to mix two different fluids at different proportions, two extra pumps are necessary to pick up, agitate and mix; or alternatively, if only one single pump is used, an externally-attached flow adjusting valve is required, making the whole pumping system more complicated.

To achieve the above-mentioned object, the present invention, in a broader sense, is to provide a multi-channel fluid conveying apparatus, comprising a valve seat including at least one outlet channel and at lest one inlet channel; a valve cover arranged on the valve seat; a valve membrane interposed between the valve seat and the valve cover, and having a plurality of valve structures made of the same material with the same thickness, and at least one of the valve structures has a rigidity different from those of other valve structures; a plurality of temporary-deposit chambers interposed between the valve membrane and the valve cover and between the valve membrane and the valve seat; and an actuating device having a periphery fixed to the valve cover.

Other objects, advantages, and novel features of the present invention will become more apparent from the following detailed description when taken in conjunction with the accompanying drawings.

BRIEF DESCRIPTION OF THE DRAWINGS

FIGS. 6(a) to (e) are schematic views illustrating modifications of the inlet valve structures and the outlet valve structures of the valve membrane according to the present invention.

DETAILED DESCRIPTION OF THE PREFERRED EMBODIMENTS

Exemplified embodiments realizing the features of the present invention will be described in detail hereafter. It should be understood that a variety of modifications, made in various modes and not away from the scope of the present invention, is possible. The following description and drawings are essentially for the purpose of explaining, but not limiting the present invention.

According to the present invention, the multi-channel fluid conveying apparatus is primarily designed with such a concept of arrangement that one pressure chamber and one actuator incorporate with a plurality of flow channels, a plurality of inlets and outlets, and a plurality of valve structures, so that under a condition that no overall dimension of the fluid conveying apparatus is increased, flow rate and lift of the apparatus can be greatly increased. As such, the present invention are quite adaptable to those application occasions that higher flow rate and lift are required.

Figure 2A:
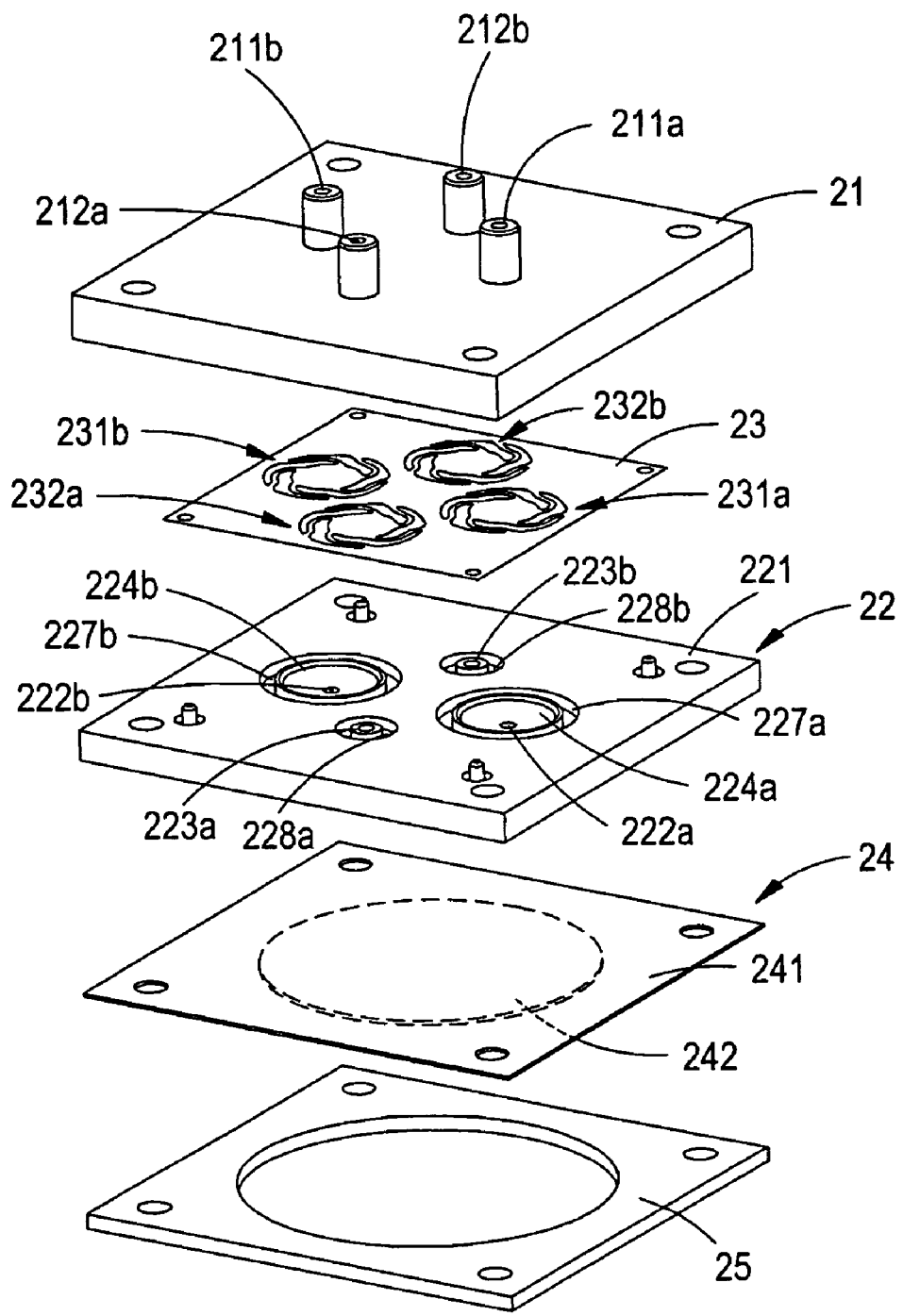
FIG. 2(a) is an exploded view illustrating a multi-channel fluid conveying apparatus according to the present invention.
Figure 2B:
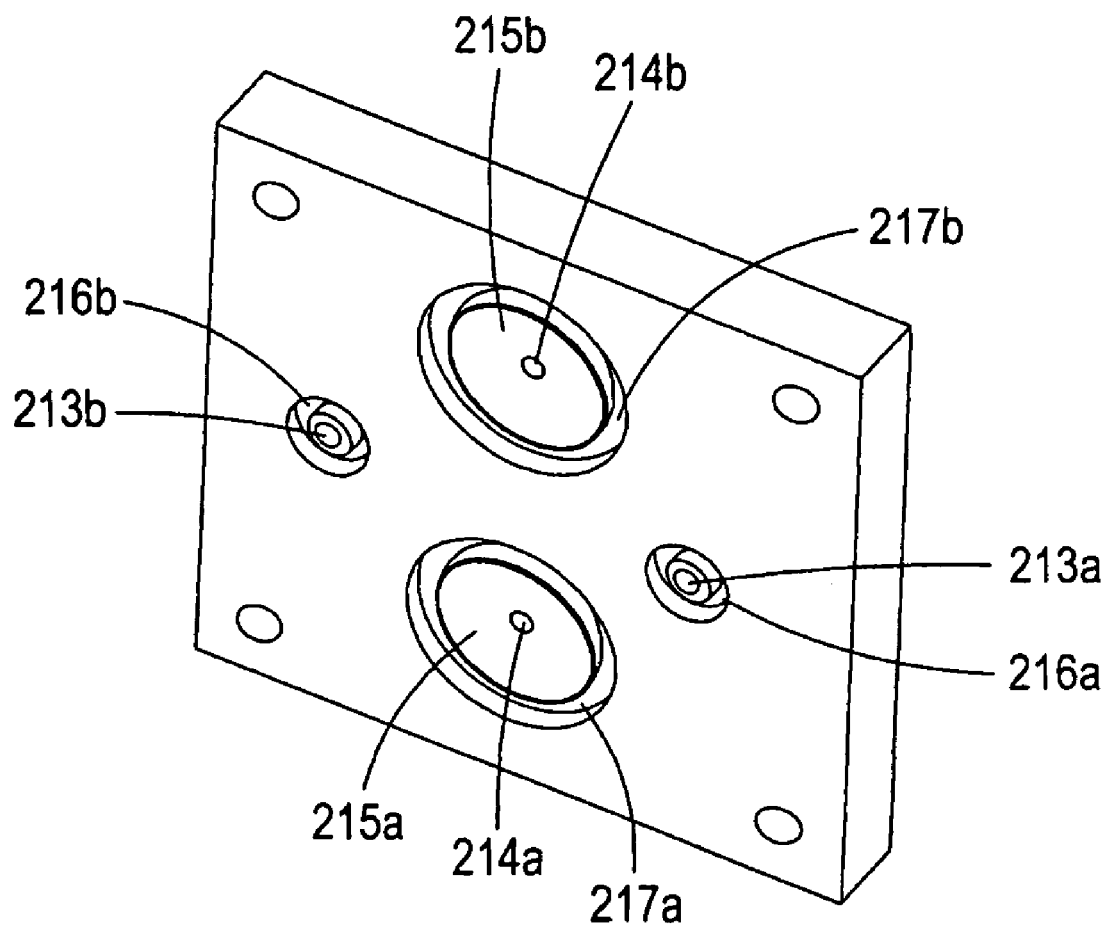
FIG. 2(b) is a perspective view illustrating the backside of a valve seat according to the present invention.
Figure 2C:
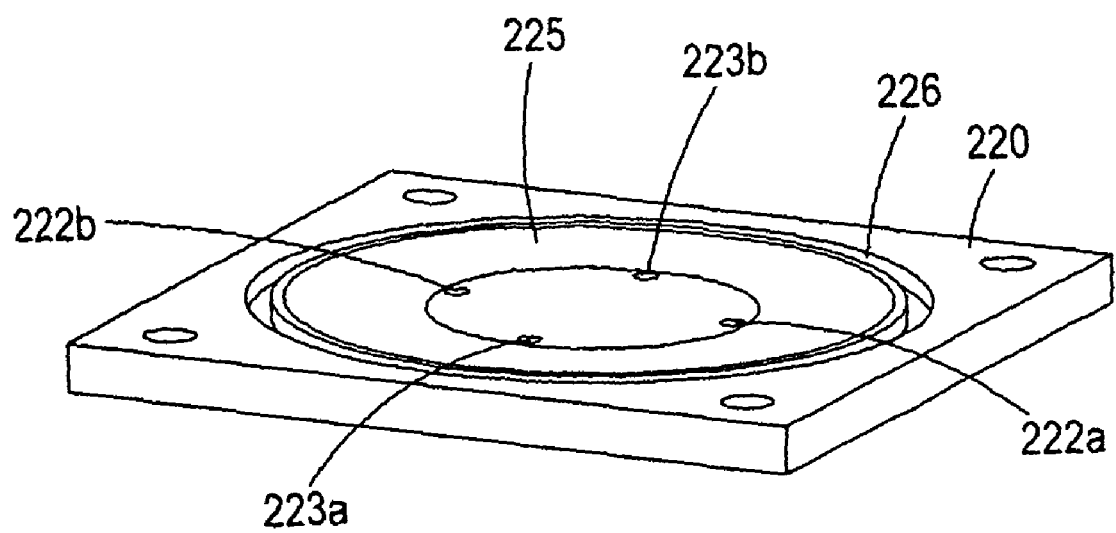
FIG. 2(c) is a perspective view illustrating the backside of a valve cover according to the present invention.

Referring to FIG. 2(a), an exploded view illustrating a multi-channel fluid conveying apparatus according to the present invention, the multi-channel fluid conveying apparatus 20 comprises a valve seat 21, a valve cover 22, a valve membrane 23, and an actuating device 24 and an apparatus cover 25. A pressure chamber 225 (as shown in FIG. 2(c)) is formed between the valve cover 22 and the actuating device 24, primarily for storing fluids. The multi-channel fluid conveying apparatus 20 is assembled in such a manner that the valve membrane 23 is interposed between the valve seat 21 and the valve cover 22, where the valve membrane 23, the valve seat 21 and the valve cover 22 are arranged correspondingly to one another. First temporary-deposit chambers are formed between the valve membrane 23 and the valve cover 22, and second temporary-deposit chambers are formed between the valve membrane 23 and the valve seat 21. The actuating device 24 is arranged correspondingly to the valve cover 22, and includes a diaphragm 241 and an actuator 242 so as to drive the multi-channel fluid conveying apparatus 20 for action. Finally, the apparatus cover 25 is disposed underneath the actuating device 24. Therefore, the multi-channel fluid conveying apparatus 20 is accomplished by stacking in sequence, corresponding to one another, the valve seat 21, the valve membrane 23, the valve cover 22, the actuating device 24, and the apparatus cover 25 (as shown in FIG. 2(e)).

Figure 3A:
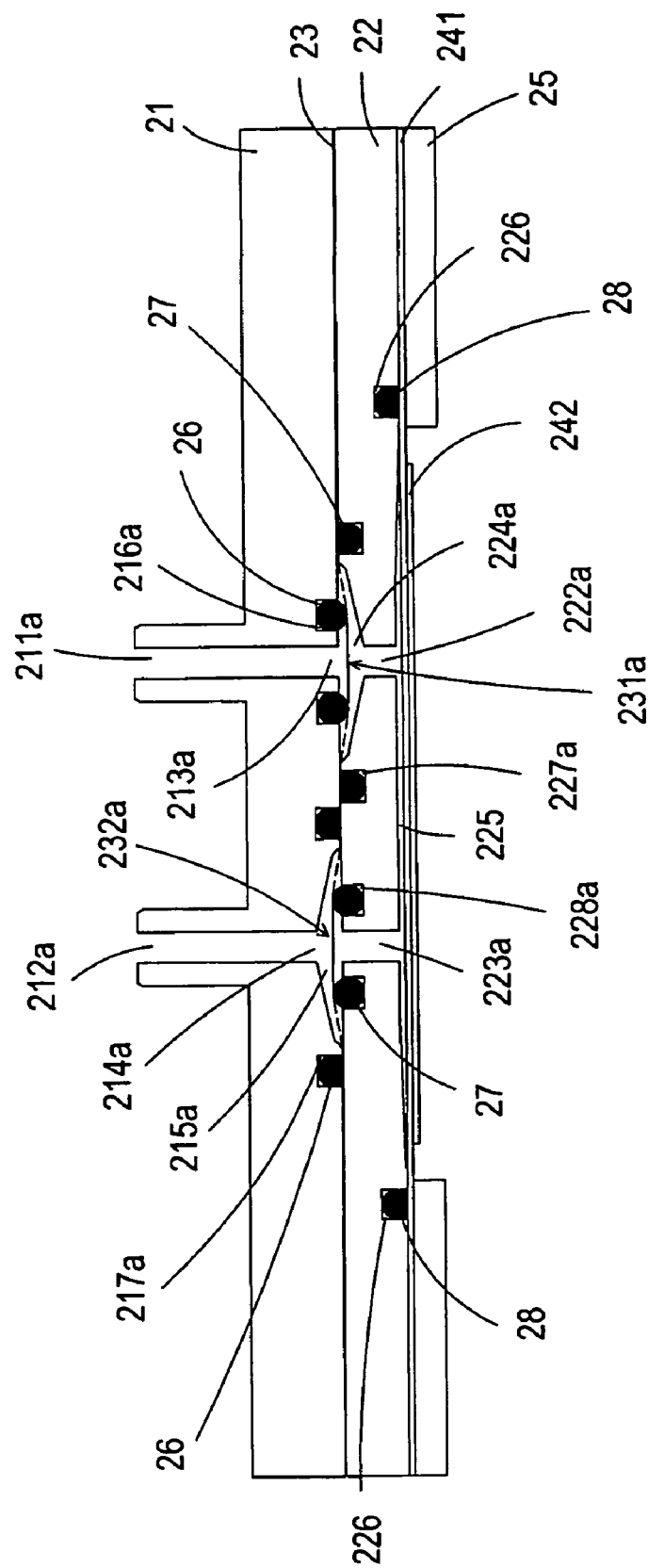
FIG. 3(a) is a cross-sectional view, taken from cutting line A-A of FIG. 2(e), illustrating the multi-channel fluid conveying apparatus in a status of non-action.
Figure 4A:
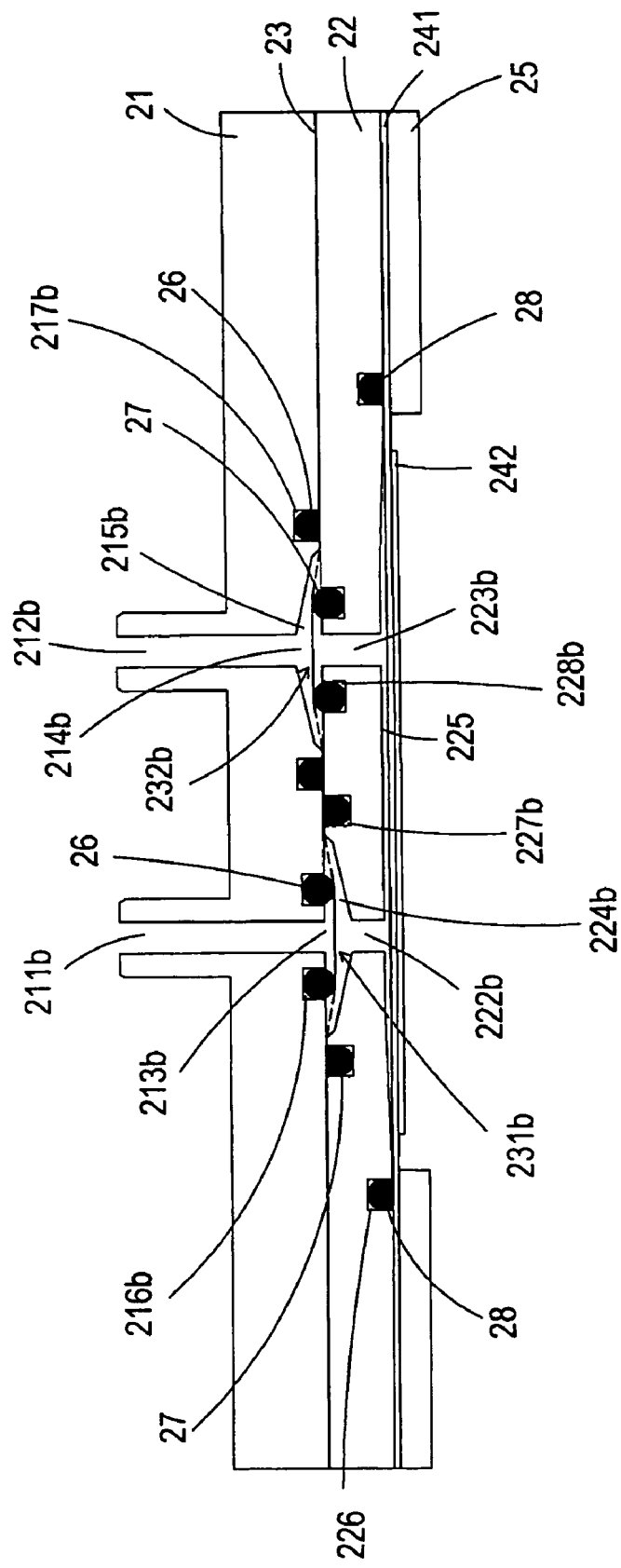
FIG. 4(a) is a cross-sectional view, taken from cutting line B-B of FIG. 2(e), illustrating the multi-channel fluid conveying apparatus in a status of non-action.

The valve seat 21 and the valve cover 22 are the main structure in guiding the fluid in and out of the multi-channel fluid conveying apparatus 20. Further, referring to FIG. 2(b), a perspective view illustrating a backside of the valve seat 21, and to FIG. 2(a), the valve seat 21 includes, but not limited to include, inlet channels 211a, 211b and outlet channels 212a, 212b. Namely, the number of the inlet and outlet channels may each be one or more than one. The fluid is introduced from outside, and conveyed to openings 213a, 213b of the valve seat 21, respectively, by way of the inlet channels 211a, 211b. In the present invention, the second temporary-deposit chamber formed between the valve membrane 23 and the valve seat 21 refer to, but not limited to, outlet temporary deposit chambers 215a, 215b, shown in FIG. 2(b). The outlet temporary deposit chambers 215a, 215b are formed on the valve seat 21, and at concaves corresponding to the outlet channels 212a, 212b, and are communicated with the outlet channels 212a, 212b, respectively. The outlet temporary deposit chambers 215a, 215b are provided for storing the fluid, where the fluid flows from the outlet temporary deposit chambers 215a, 215b, through openings 214a, 214b, to the outlet channels 212a, 212b, and out of the multi-channel fluid conveying apparatus 20. Further, there are several recesses provided for receiving sealing rings 26, as shown in FIG. 3(a) and FIG. 4(a). According to the present invention, the valve seat 21 is provided with recesses 216a, 216b surrounding the openings 213a, 213b, and with recesses 217a, 217b surrounding the outlet temporary deposit chambers 215a, 215b.

Now referring to FIG. 2(c), a perspective view illustrating a backside of the valve cover 22 according to the present invention, and to FIG. 2(c), the valve cover 22 includes an upper surface 220 and an under surface 221, where inlet valve channels 222a, 222b and outlet valve channels 223a, 223b pass through the upper surface 220 and the under surface 221. The inlet valve channels 222a, 222b are arranged correspondingly to the openings 213a, 213b of the valve seat 21, respectively, while the outlet valve channels 223a, 223b to the openings 214a, 214b, respectively, inside the outlet temporary deposit chambers 215a, 215b of the valve seat 21. Further, in the present invention, the plurality of first temporary-deposit chambers formed between the valve membrane 23 and the valve cover 22 refer to, but not limit to, inlet temporary deposit cavities 224a, 224b, as shown in FIG. 2(a). The inlet temporary deposit cavities 224a, 224b are formed by the recesses located corresponding to the inlet valve channels 222a, 222b at the under surface 221 of the valve cover 22. As such, the inlet temporary deposit cavities 224a, 224b are communicated with the inlet valve channels 222a, 222b.

Referring to FIG. 2(c), the upper surface 220 of the valve cover 22 is partially recessed so as to form a pressure chamber 225 arranged correspondingly to the actuator 242 of the actuating device 24. The pressure chamber 225 is, through the inlet valve channels 222a, 222b, communicated with the inlet temporary deposit cavities 224a, 224b, respectively, and also communicated with the outlet valve channels 223a, 223b. Therefore, in case the actuator 242 is actuated by a voltage, making the actuating device 24 deformed and protruded downward, such that the pressure chamber 225 expands and thus a negative-pressure is produced. This will cause the fluid flow into the pressure chamber 225 through the inlet valve channels 222a, 222b. Thereafter, in case the direction of the electric field applied to the actuator 242 has changed, the actuator 242 will cause the actuating device 24 protruded upward, making the volume of the pressure chamber 225 shrinked, so that a positive pressure difference is produced in the pressure chamber 225. This will cause the fluid flowing out of the pressure chamber 225 through the outlet valve channels 223a, 223b. In the meantime, part of fluid will flow into the inlet valve channels 222a, 222b and the inlet temporary deposit cavities 224a, 224b. At this moment, because inlet valve structures 231a, 231b are compressed and closed (see FIGS. 3(a), 3(c), 4(a), and 4(c)), the fluid will not flow through inlet valve blades 2313a, 2313b and will not cause a reverse flow. As to the fluid temporarily deposited in the inlet temporary deposit cavities 224a, 224b, when the actuator 242 is actuated again by a voltage, repeating the actuating device 24 deformed and protruded downward, such that the pressure chamber 225 expands, causing the fluid flow, from the inlet temporary deposit cavities 224a, 224b, through the inlet valve channels 222a, 222b, and into the pressure chamber 225.

Similarly, there are several concave structures provided on the valve cover 22, such that on the upper surface 220 of the valve cover 22, a recess 226 surrounding the pressure chamber 225 is provided for receiving a sealing ring 28, as shown in FIGS. 3(a) and 4(a). Whereas on the under surface 221 of the valve cover 22, there are provided with recesses 227a, 227b surrounding the inlet temporary deposit cavities 224a, 224b, and with recesses 228a, 228b surrounding the outlet valve channels 223a, 223b. Likewise, the recesses 227a, 227b each receives a sealing ring 27, as shown in FIG. 3(a) and FIG. 4(a).

Figure 2D:
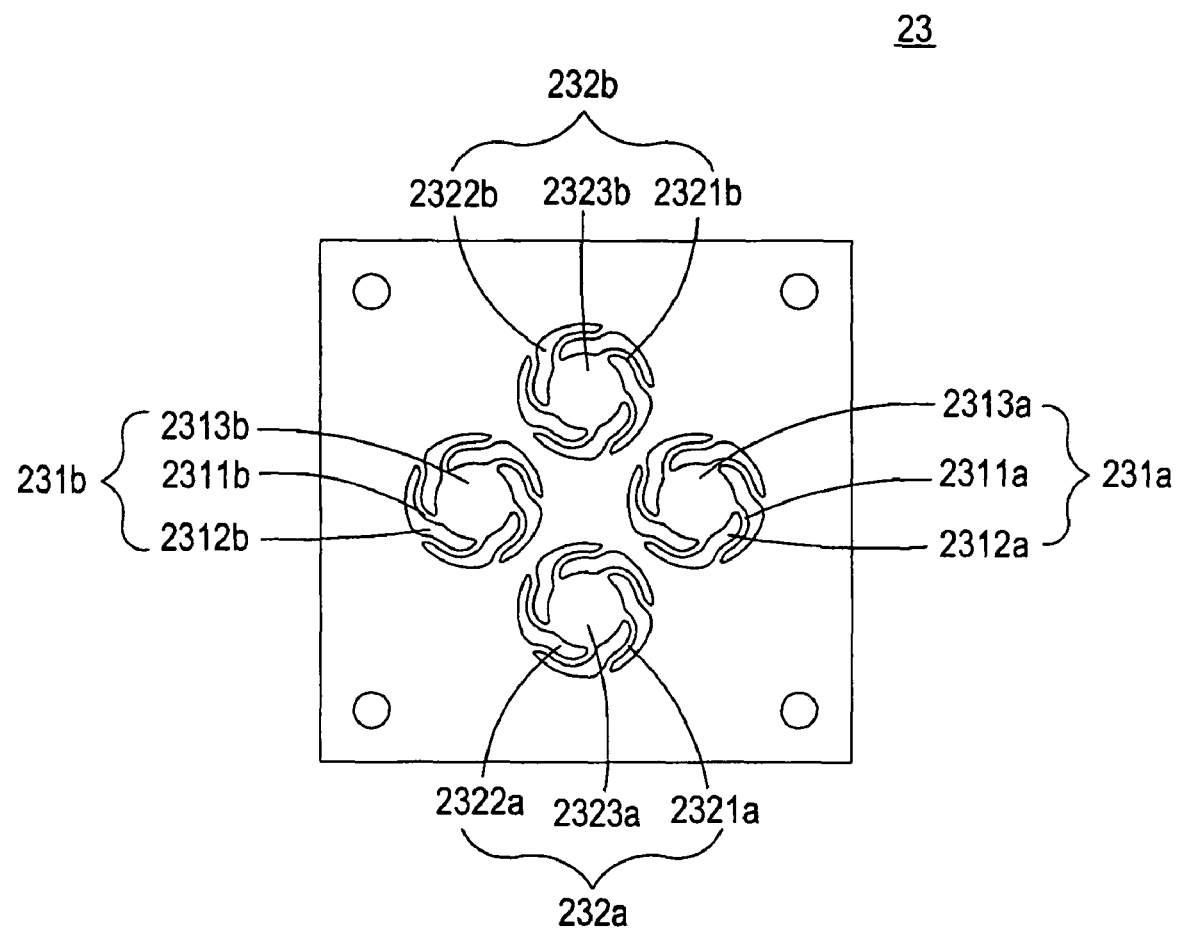
FIG. 2(d) is a top view illustrating a valve membrane according to the present invention.
Figure 2E:
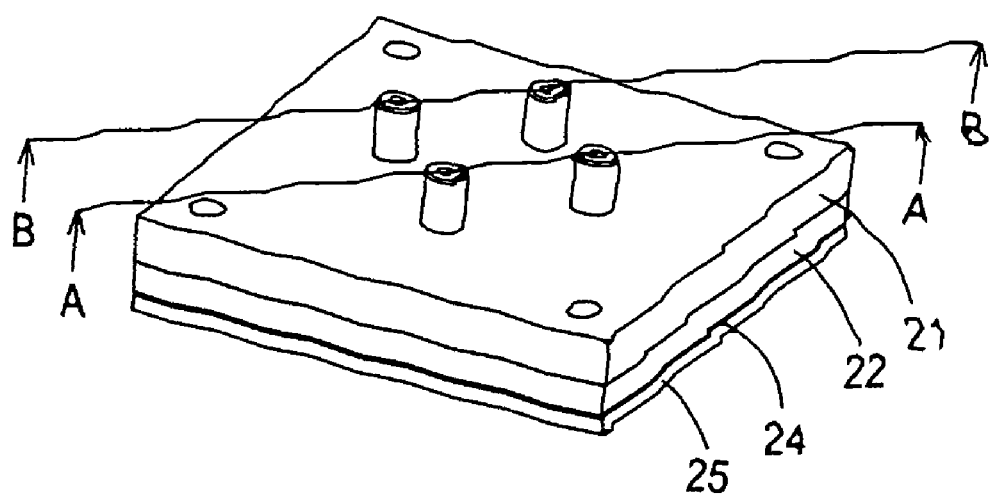
FIG. 2(e) is a perspective view illustrating the multi-channel fluid conveying apparatus according to the present invention.
Figure 3B:
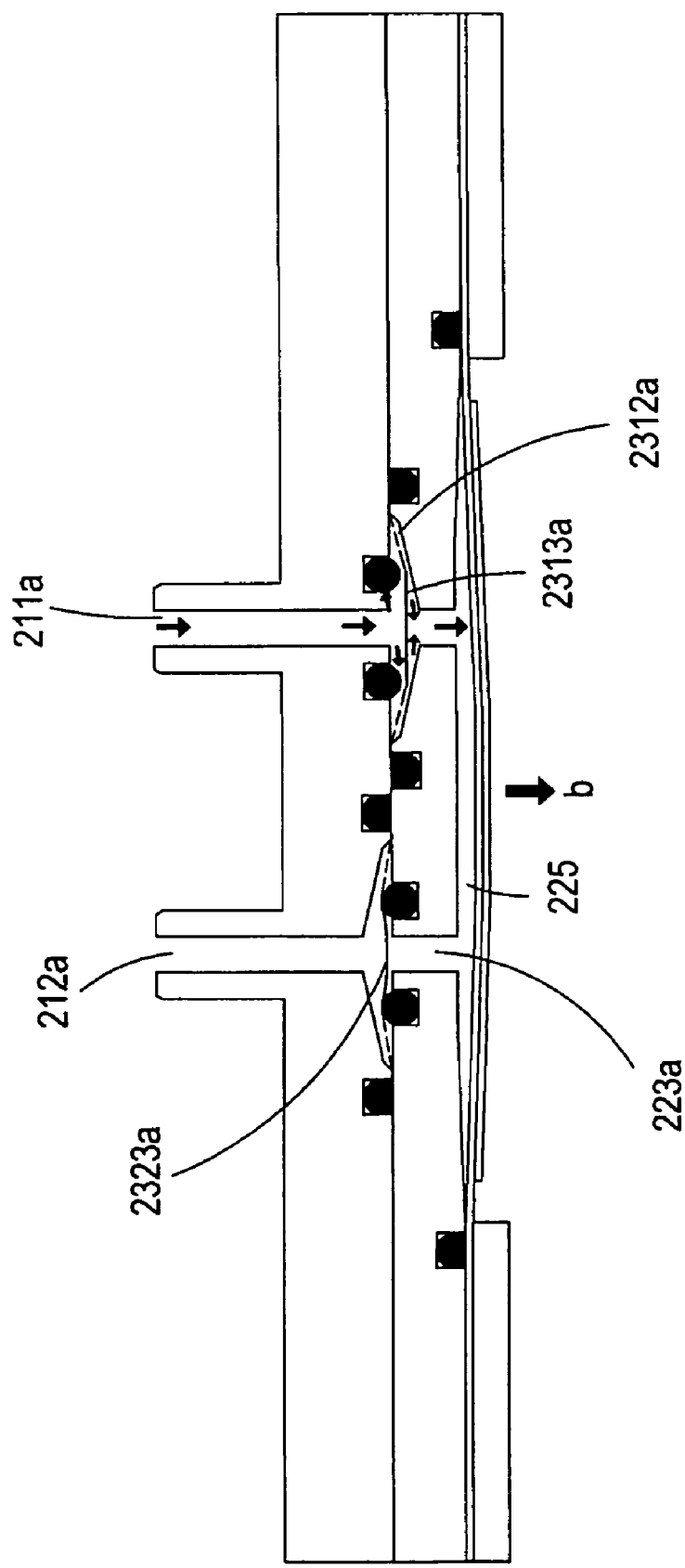
FIG. 3(b) is a cross-sectional view illustrating a status that a pressure chamber expands.
Figure 3C:
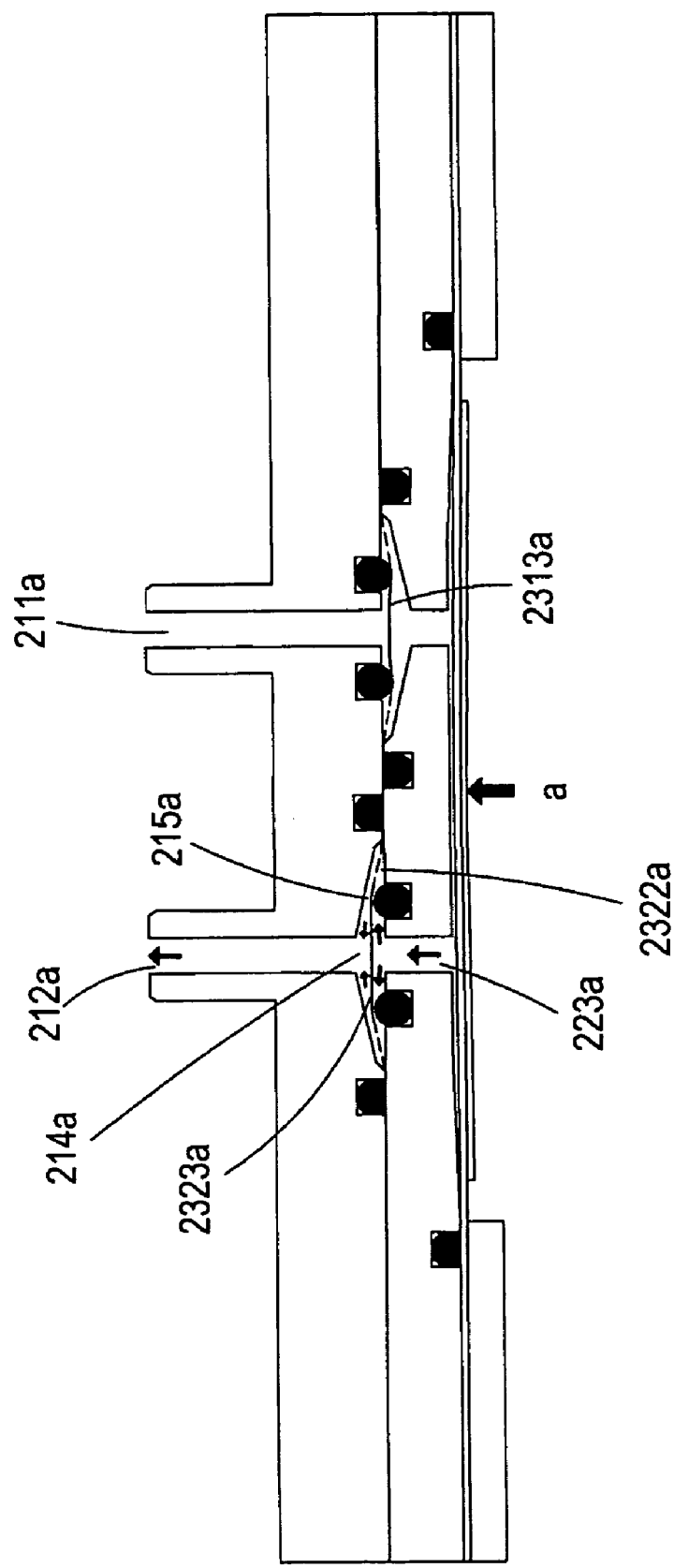
FIG. 3(c) is a cross-sectional view illustrating a status that the pressure chamber is compressed.
Figure 4B:
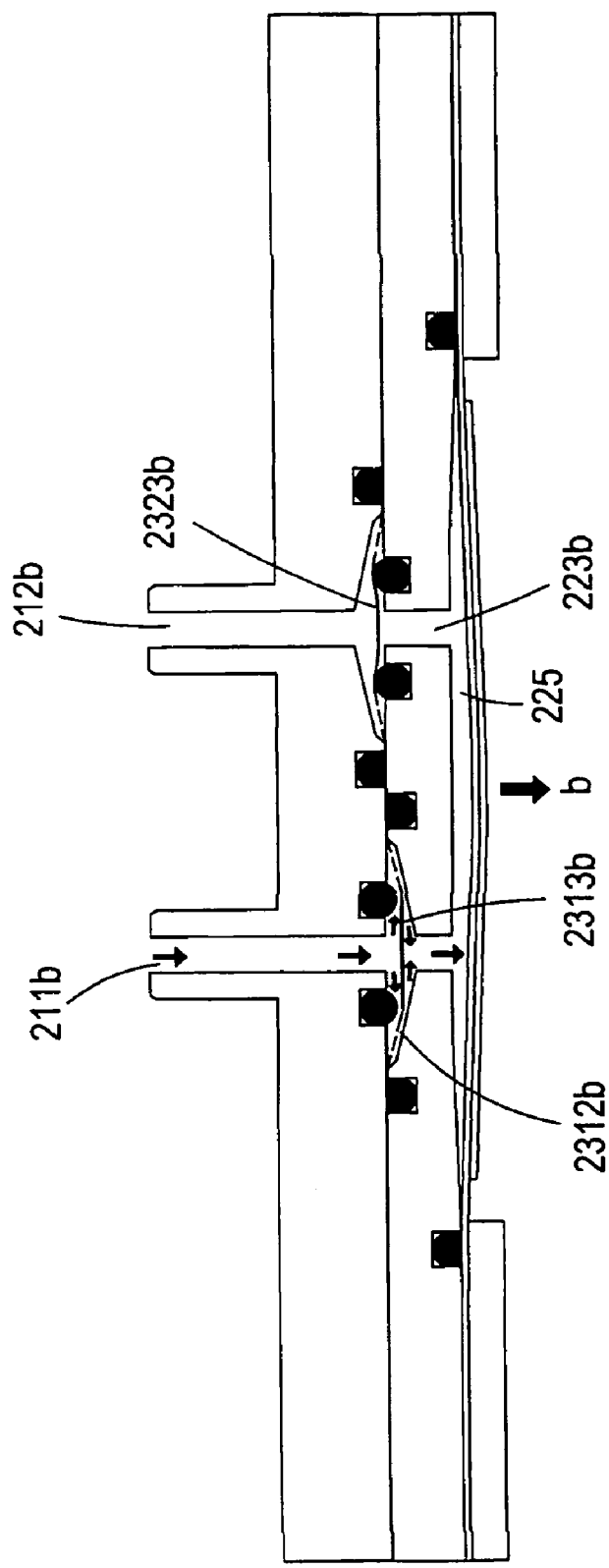
FIG. 4(b) is a cross-sectional view illustrating a status that the pressure chamber expands.
Figure 4C:
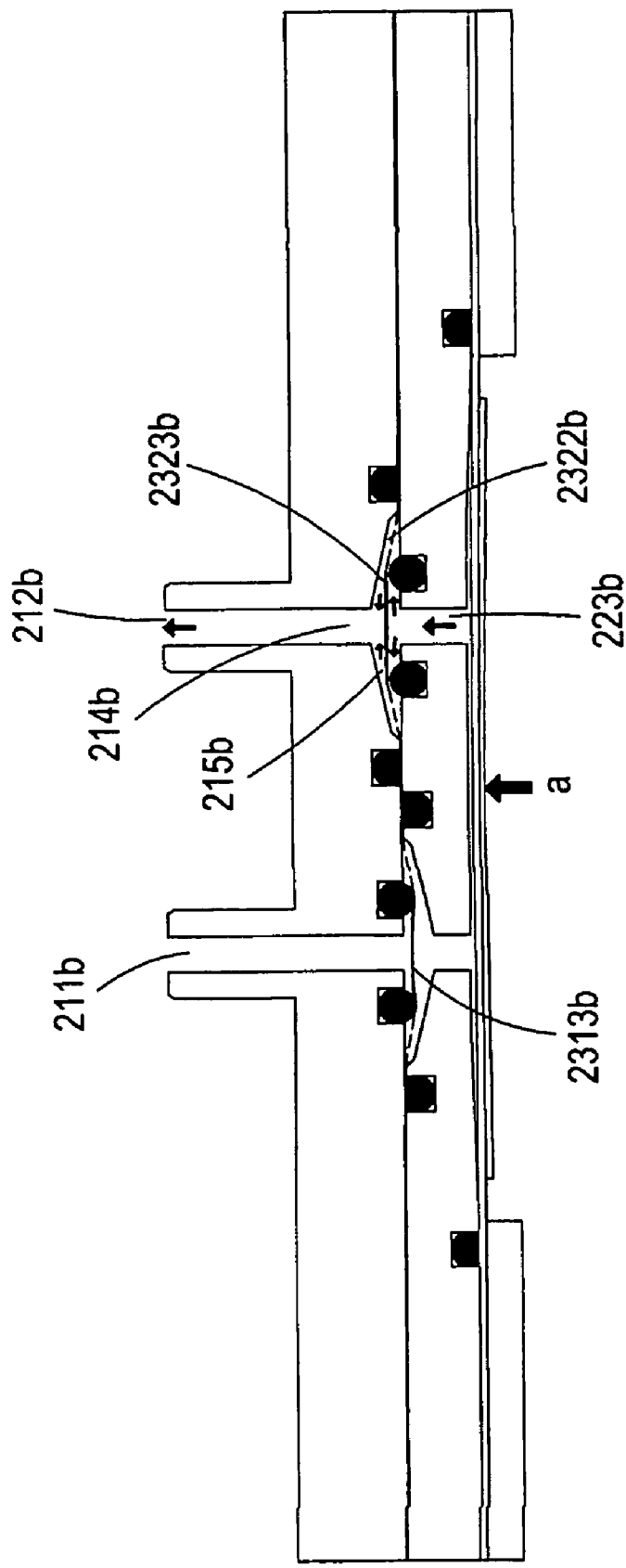
FIG. 4(c) is a cross-sectional view illustrating a status that the pressure chamber is compressed.

Now referring to FIG. 2(d), a top view illustrating the valve membrane 23, and to FIG. 2(a), the valve membrane 23 is processed by, for instance, a traditional machining, a yellow-light etching, or a laser machining, an electroforming, or an electric discharge machining. The valve membrane 23 is a sheet structure of substantially uniform thickness, and includes a plurality of hollow-out valve switches, namely, first valve switches and second valve switches. The first valve switches refer to, but not limit to, the inlet valve structures 231a, 231b; and the second valve switches to outlet valve structures 232a, 232b. The number of the first and second valve switches can each be one or more than one. The inlet valve structures 231a, 231b are provided with inlet valve blades 2313a, 2313b, respectively, and with a plurality of vents 2312a, 2312b surrounding the inlet valve blades 2313a, 2313b. There are also provided with valve arms 2311a, 2311b in connection with the inlet valve blades 2313a, 2313b between the vents 2312a, 2312b. When the valve membrane 23 is subject to a stress transmitting from the pressure chamber 225, as shown in FIG. 3(c) and FIG. 4(c), the inlet valve structures 231a, 231b will fully abut on the valve seat 21, and that the inlet valve blades 2313a, 2313b will abut on the sealing rings 26 at the recesses 216a, 216b so as to seal the openings 213a, 213b of the valve seat 21. The vents 2312a, 2312b and the valve arms 2311a, 2311b, therefore, float and abut on the valve seat 21, and due to a closing action of the inlet valve structures 231a, 231b, it is impossible for the fluid to flow out therefrom.

The valve membrane 23 is subject to a suction force resulted from an increase of volume in the pressure chamber 225. Since the sealing rings 26 received in the recesses 216a, 216b of the valve seat 21 have provided a preforce on the inlet valve structures 231a, 231b, the inlet valve blades 2313a, 2313b can produce, with support of the valve arms 2311a, 2311b, a more significant tightening effect so as to prevent a reverse flow. When the inlet valve structures 231a, 231b move because of the negative pressure of the pressure chamber 225, as shown in FIG. 3(b) and FIG. 4(b), the fluid flows from the valve seat 21, through the vents 2312a, 2312b, to the inlet temporary deposit cavities 224a, 224b of the valve cover 22, and to the pressure chamber 225, through the inlet temporary deposit cavities 224a, 224b and through the inlet valve channels 222a, 222b. Under such circumstances, the inlet valve structures 231a, 231b can open or close rapidly in response to the positive or negative pressure difference produced by the pressure chamber 225 so as to control flow in or flow out of the fluid, and to prevent the fluid from flowing back to the valve seat 21.

Similarly, the other valve structures of the valve membrane 23, i.e. the outlet valve structures 232a, 232b, including outlet valve blades 2323a, 2323b, valve arms 2321a, 2321b, and vents 2322a, 2322b, are acted in a manner same as those of the inlet valve structures 231a, 231b. As such, no further description therefore is necessary. Nevertheless, the sealing rings 27 is arranged around the outlet valve structures 232a, 232b in a manner opposite to that the sealing rings 26 is arranged at the inlet valve structures 231a, 231b. As a result, when the pressure chamber 225 is compressed and thus a thrust is produced, the sealing rings 27 received in the recesses 228a, 228b of the valve cover 22 will provide the outlet valve structures 232a, 232b a preforce, so that the outlet valve blades 2323a, 2323b can produce, with a support of the valve arms 2321a, 2321b, a more significant tightening effect so as to prevent a reverse flow, as shown in FIG. 3(b) and FIG. 4(b). When a positive pressure of the pressure chamber 225 makes the outlet valve structures 232a, 232b move upward, the fluid can flow through the vents 2322a, 2322b, and from the pressure chamber 225, through the valve cover 22, and into the outlet temporary deposit chambers 215a, 215b of the valve seat 21, where the fluid is then discharged from the openings 214a, 214b and the outlet channels 212a, 212b. Therefore, the fluid can be discharged from the pressure chamber 225 by opening the outlet valve structures 232a, 232b and that the object of fluid conveyance can be achieved, see FIG. 3(c) and FIG. 4(c).

Further, referring to FIG. 3a, a cross-sectional view, taken from cutting line A-A of FIG. 2(e), and to FIG. 4a, a cross-sectional view, taken from cutting line B-B of FIG. 2(e), illustrating the multi-channel fluid conveying apparatus in a status of non-action, the sealing rings 26, 27 and 28 are, but not limited to be, made of rubber material with a property of desirable chemical resistance. The sealing rings 26 received in the recesses 216a, 216b surrounding the openings 213a, 213b of the valve seat 21 may be of an annular structure having a thickness greater than the depth of the recesses 216a, 216b, such that when the sealing rings 26 are received in the recesses 216a, 216b, part of the sealing rings 26 can be protruded out of a surface of the valve seat 21 so as to constitute first micro-protrusion structures. This will make the inlet valve blades 2313a, 2313b of the inlet valve structures 231a, 231b of the valve membrane 23, which is adhered on the valve seat 21, become protruded upward due to the micro-protrusion structures of the sealing rings 26. Rest of the valve membrane 23 abuts against the valve cover 22, such that the micro-protrusion structure pushes against the inlet valve structures 231a, 231b and thus produces a preforce, helping to form a more tightening effect for preventing from a backflow. In addition, because the upward micro-protrusion structures of the sealing rings 26 is located at the inlet valve structures 231a, 231b of the valve membrane 23, the inlet valve blades 2313a, 2313b, prior to an action of the inlet valve structures 231a, 231b, form between the valve seat 21 a gap. Similarly, the sealing rings 27 received in the recesses 228a, 228b surrounding the outlet valve channels 223a, 223b protrudes downward from the under surface 221 of the valve cover 22, such that second micro-protrusion structures are formed at the outlet valve structures 232a, 232b of the valve membrane 23. Since the second micro-protrusion structures are similar in function with the first micro-protrusion structures, except that the second micro-protrusion structures are arranged correspondingly to the first micro-protrusion structures formed at the inlet valve structures 231a, 231b. Therefore, no further description is necessary for the second micro-protrusion structure.

The sealing rings 26, 27, 28 arranged in the recesses 217a, 217b, 227a, 227b, and 226 are used for providing a tightening seal between the valve seat 21 and the valve membrane 23, between the valve membrane 23 and the valve cover 22, and between the valve cover 22 and the actuating device 24 so as to prevent leaking of the fluid.

Of course, the above-mentioned micro-protrusion structures can be made, in addition to the incorporation of the recesses and sealing rings, for some embodiments, by a semiconductor manufacturing process, such that the valve seat 21 and the valve cover 22 can be formed by a yellow-light etching or an electroforming.

Now referring to FIGS. 3(a) to (c), and to FIGS. 4(a) to (c), upon assembling one another of the apparatus cover 25, the actuating device 24, the valve cover 22, the valve membrane 23, the sealing rings 26, 27, 28, and the valve seat 21, the openings 213a, 213b of the valve seat 21 correspond to the inlet valve structures 231a, 231b of the valve membrane 23 and to the inlet valve channels 222a, 222b of the valve cover 22, respectively. Besides, since the sealing rings 26 are arranged in the recesses 216a, 216b, the inlet valve structures 231a, 231b of the valve membrane 23 can be protruded slightly out of the valve seat 21. The seal rings 26 received in the recesses 216a, 216b presses against the valve membrane 23 so as to produce a preforce, making the inlet valve structures 231a, 231b, prior to action, can be formed with the surface of the valve seat 21 a gap. Similarly, for the outlet valve structures 232a, 232b, the sealing rings 27 are likewise arranged in the recesses 228a, 228b so as to form a gap between the under surface 221 of the valve cover 22.

When a voltage is applied to drive the actuator 242, the actuating device 24 is deformed and becomes curved, as shown in FIGS. 3(b) and 4(b), where the actuating device 24 is deformed and curved downward along a direction b (indicated with arrow), so that there is an increase of volume in the pressure chamber 225 and that a suction force is produced. This will make the inlet valve structures 231a, 231b and outlet valve structures 232a, 232b of the valve membrane 23 subject to a downward drawing force, and that the inlet valve blades 2313a, 2313b of the inlet valve structures 231a, 231b, which are already subject to a preforce, can be opened rapidly, as shown in FIG. 3(b) and FIG. 4(b), so that fluid can be sucked in a great amount through the inlet channels 211a, 211b of the valve seat 21, and through the openings 213a, 213b of the valve seat 21, the vents 2312a, 2312b of the inlet valve structures 231a, 231b of the valve membrane 23, the inlet temporary deposit cavities 224a, 224b of the valve cover 22, and through the inlet valve channels 222a, 222b of the valve cover 22, and into the pressure chamber 225. At this moment, since the inlet valve structures 231a, 231b and outlet valve structures 232a, 232b of the valve membrane 23 are subject to the downward drawing force, making the outlet valve blades 2323a, 2323b of the outlet valve structures 232a, 232b, located at the other end, seal the outlet valve channels 223a, 223b, due to the downward drawing force, and thus the outlet valve structures 232a, 232b are closed.

When the actuating device 24, subject to a change of electric field, is deformed and curved upward in a direction a (indicated with an arrow), as shown in FIGS. 3(c) and 4(c), the pressure chamber 225 will be compressed, such that a thrust is formed toward the fluid inside the pressure chamber 225, and that the inlet valve structures 231a, 231b and outlet valve structures 232a, 232b of the valve membrane 23 are subject to an upward thrust, making the outlet valve blades 2323a, 2323b of the outlet valve structures 232a, 232b, which are located above the sealing rings 27 received in the recesses 228a, 228b, can be opened rapidly, as shown in FIGS. 3(c) and 4(c). Under the circumstances, the fluid will flow out, through the outlet valve channels 223a, 223b of the valve cover 22, the vents 2322a, 2322b of the outlet valve structures 232a, 232b of the valve membrane 23, the outlet temporary deposit chambers 215a, 215b, the openings 214a, 214b and the outlet channels 212a, 212b of the valve seat 21, and out of the multi-channel fluid conveying apparatus 20 in a great amount so as to complete a fluid conveyance process.

Likewise, since the inlet valve structures 231a, 231b are subject to the upward thrust, the inlet valve blades 2313a, 2313b seal the openings 214a, 214b, so that the inlet valve structures 231a, 231b are closed and that reverse flow of the fluid becomes impossible. With the help of the inlet valve structures 231a, 231b and the outlet valve structures 232a, 232b, incorporating the sealing rings 26, 27 arranged in the recesses 216a, 216b and the recesses 228a, 228b of the valve seat 21 and of the valve cover 22, the fluid will not flow back during conveyance of the fluid so as to achieve a conveyance of higher efficiency. In particular, according to the present invention, the multi-channel fluid conveying apparatus 20 is provided with a plurality of the inlet valve structures 231a, 231b and of the outlet valve structures 232a, 232b, without changing dimension of the valve membrane 23, and with a plurality of various inlet channels 211a, 211b and outlet channels 212a, 212b so as to form plural flow channels for mixing different fluids and for distributing and conveyance thereof.

Figure 5A:
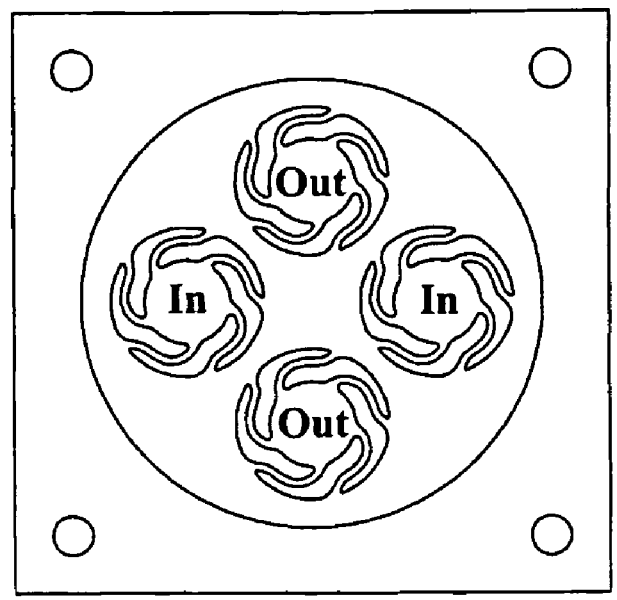
FIGS. 5(a) to (e) are schematic views illustrating modifications of layout for inlet valve structures and outlet valve structures of the valve membrane according to the present invention.
Figure 5B:
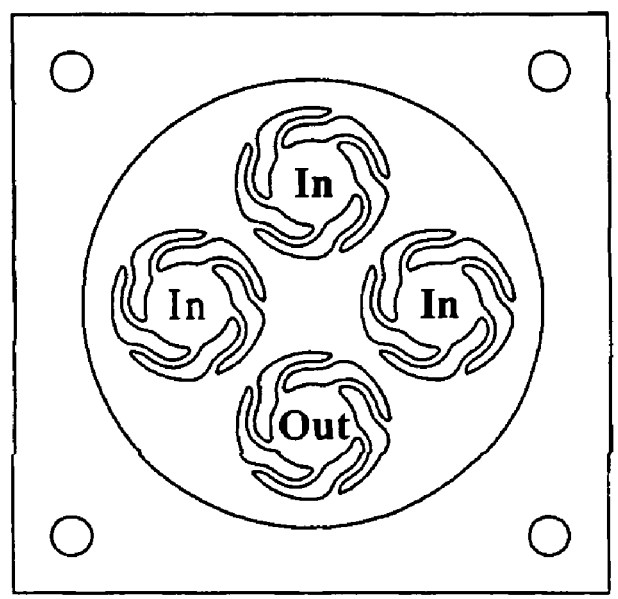
Figure 5C:
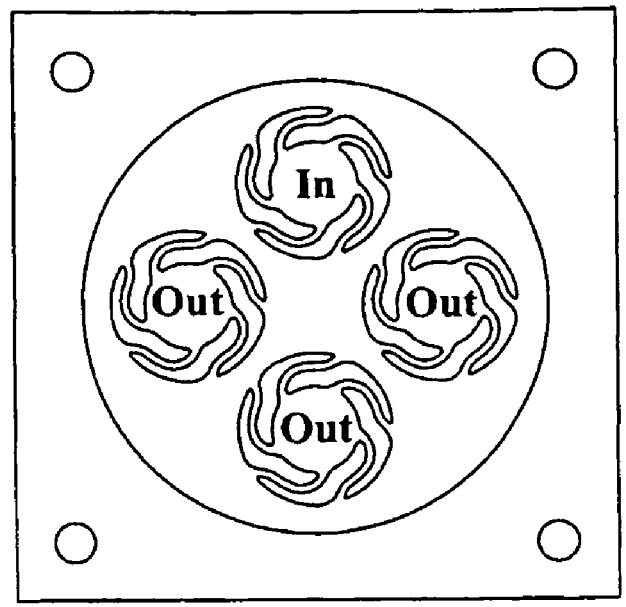
Figure 5D:
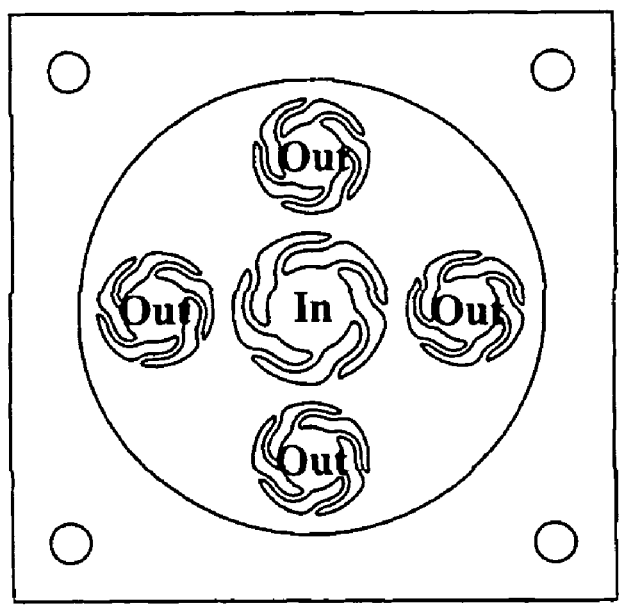
Figure 5E:
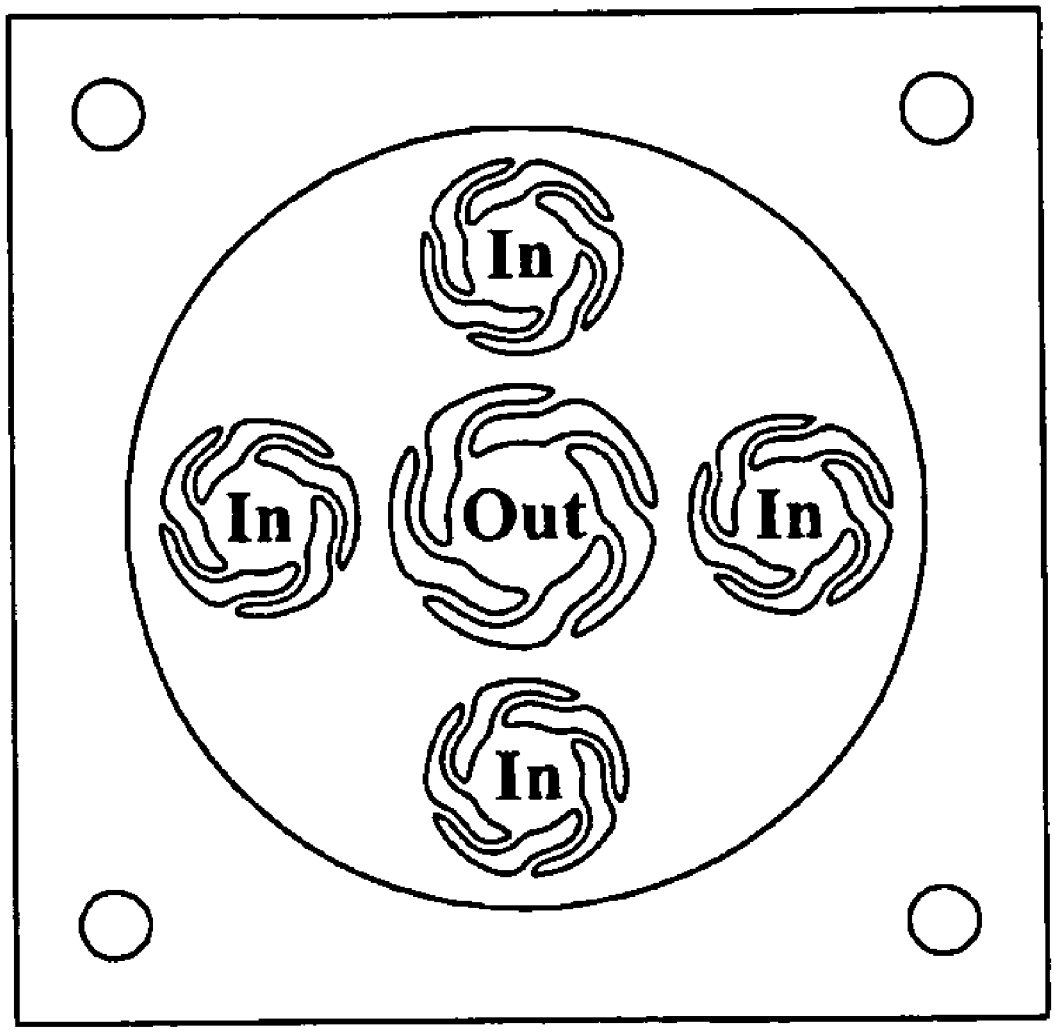
Figure 7A:
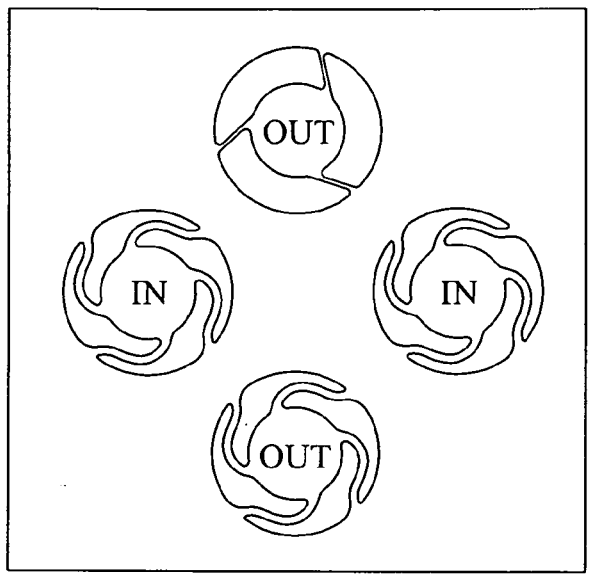
FIGS. 7(a), 8(a), 9(a), 10(a), 11(a), 12(a), 13(a), 14(a), 15(a), 16(a), 17(a) and 18(a) are schematic views illustrating the valve membrane incorporating a plurality of valve structures, with various rigidity, according to the present invention.
Figure 7B:
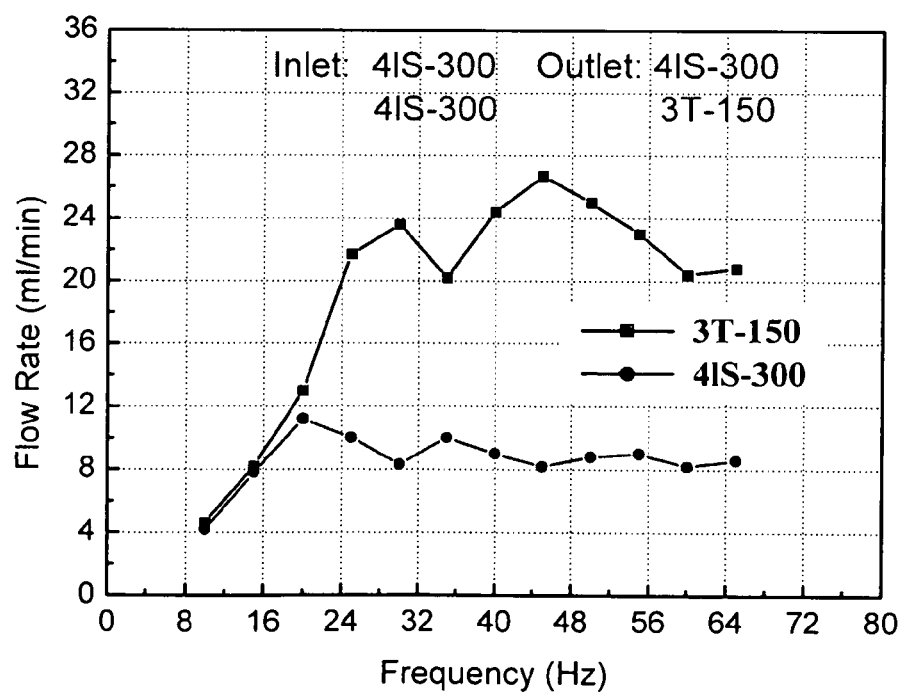
FIGS. 7(b), 8(b), 9(b), 10(b), 11(b), 12(b), 13(b), 14(b), 15(b); 16(b), 17(b) and 18(b) are graphic views illustrating flow rate data obtained from experiments each made on the two outlet valve structures of different proportional rigidity, as shown in FIG. 7(a), 8(a), 9(a), 10(a), 11(a), 12(a), 13(a), 14(a), 15(a), 16(a), 17(a) or 18(a).
Figure 8A:
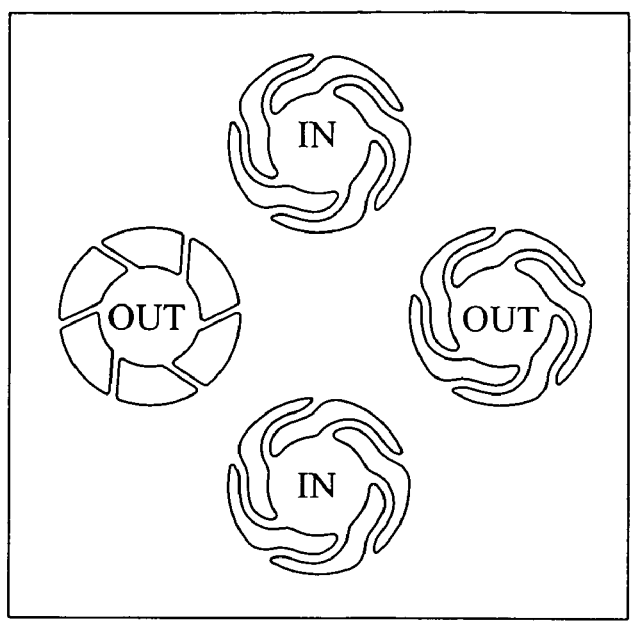
Figure 8B:
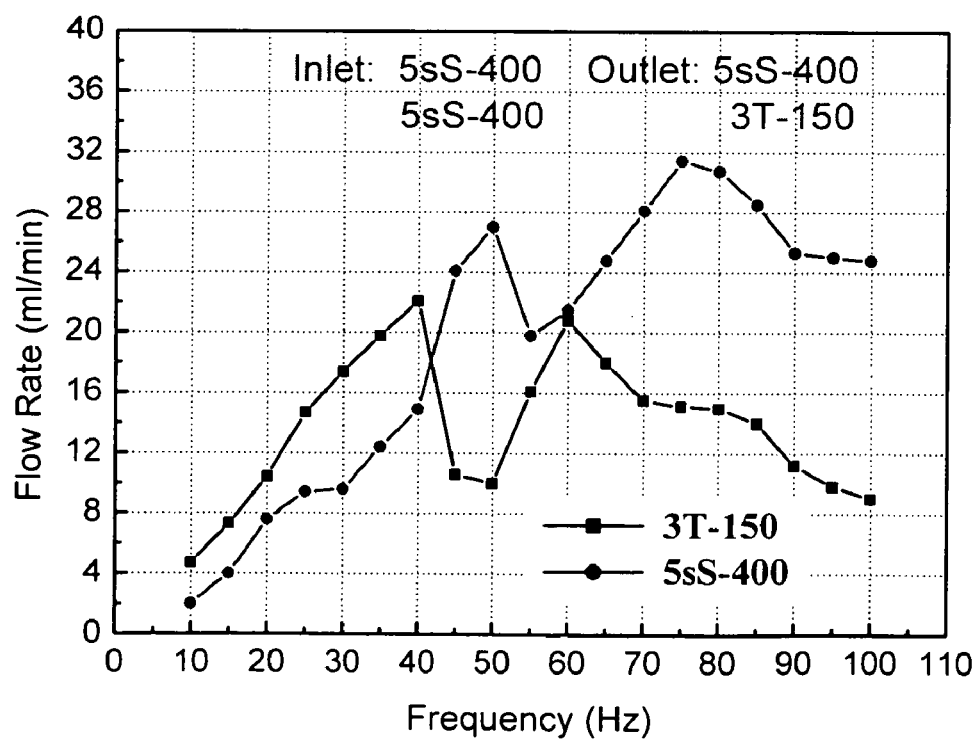
Figure 9A:
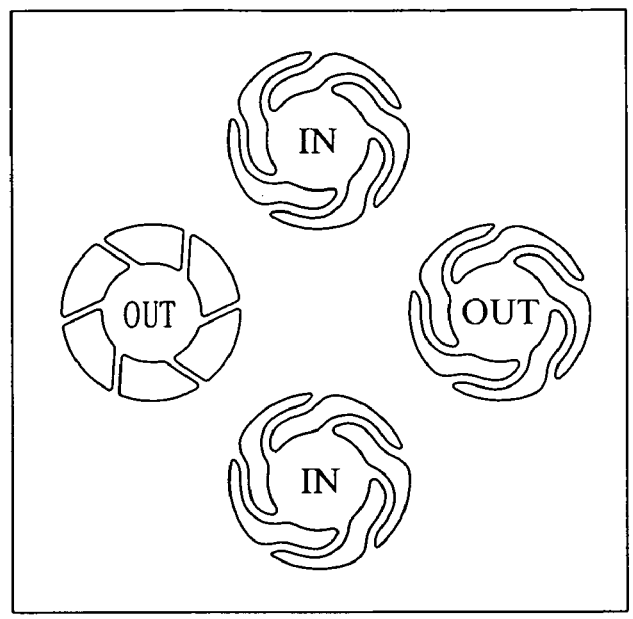
Figure 9B:
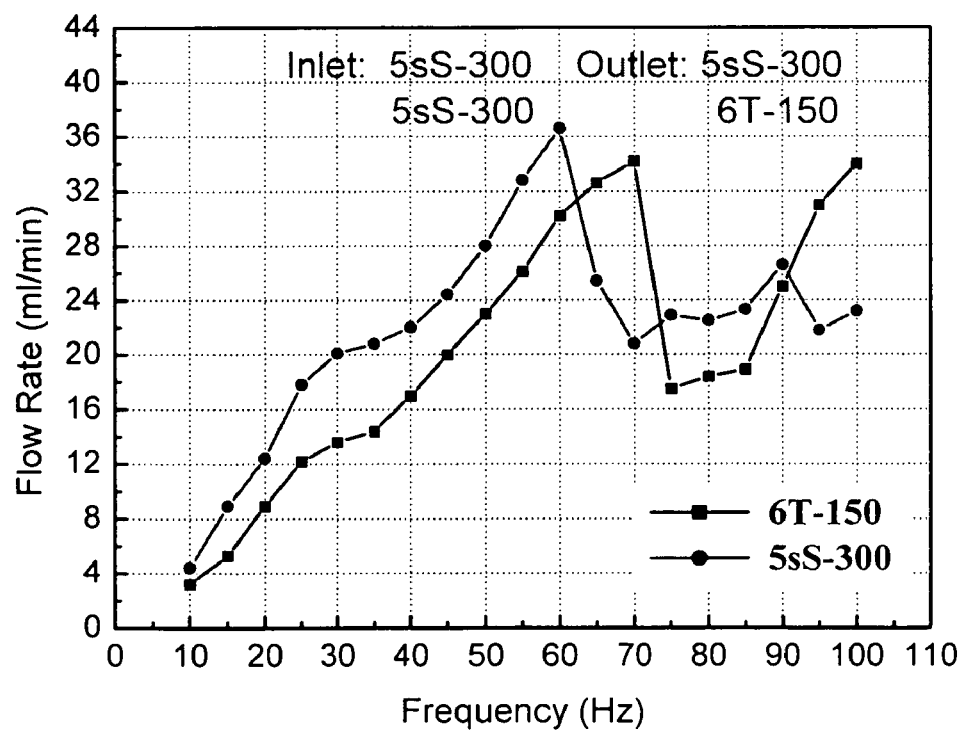
Figure 10A:
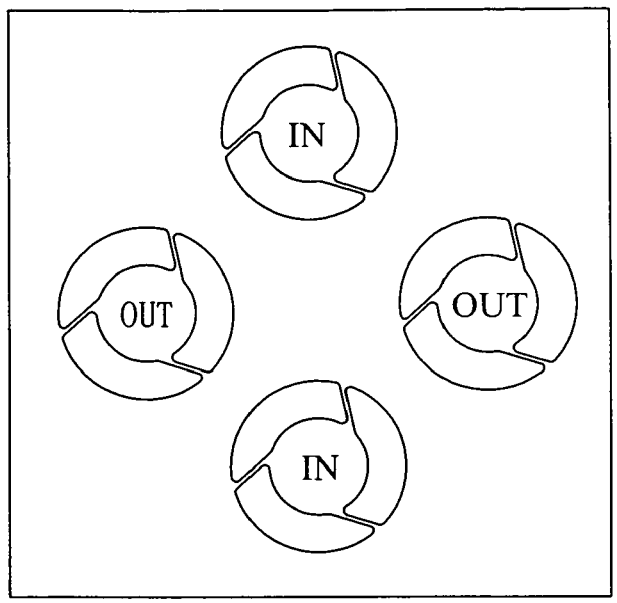
Figure 10B:
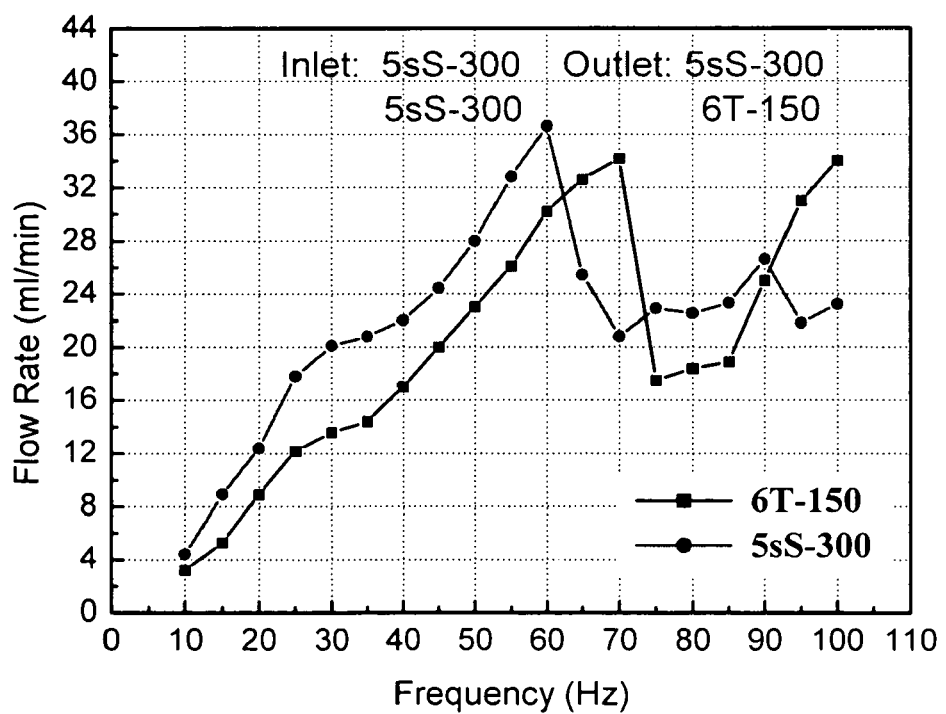
Figure 11A:
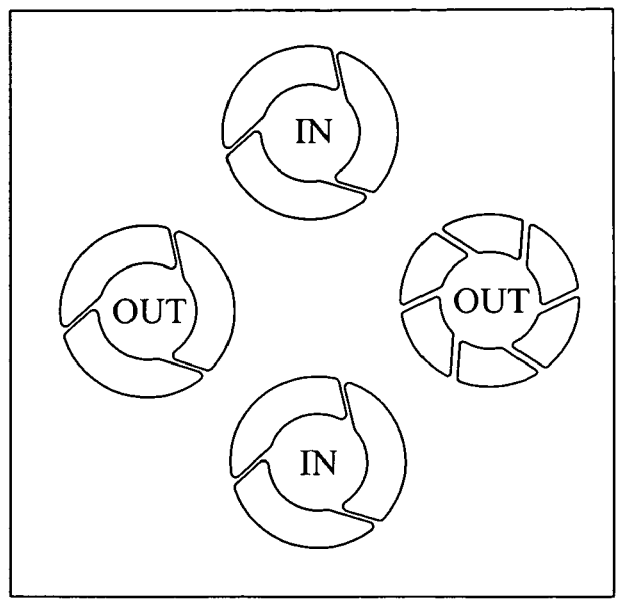
Figure 11B:
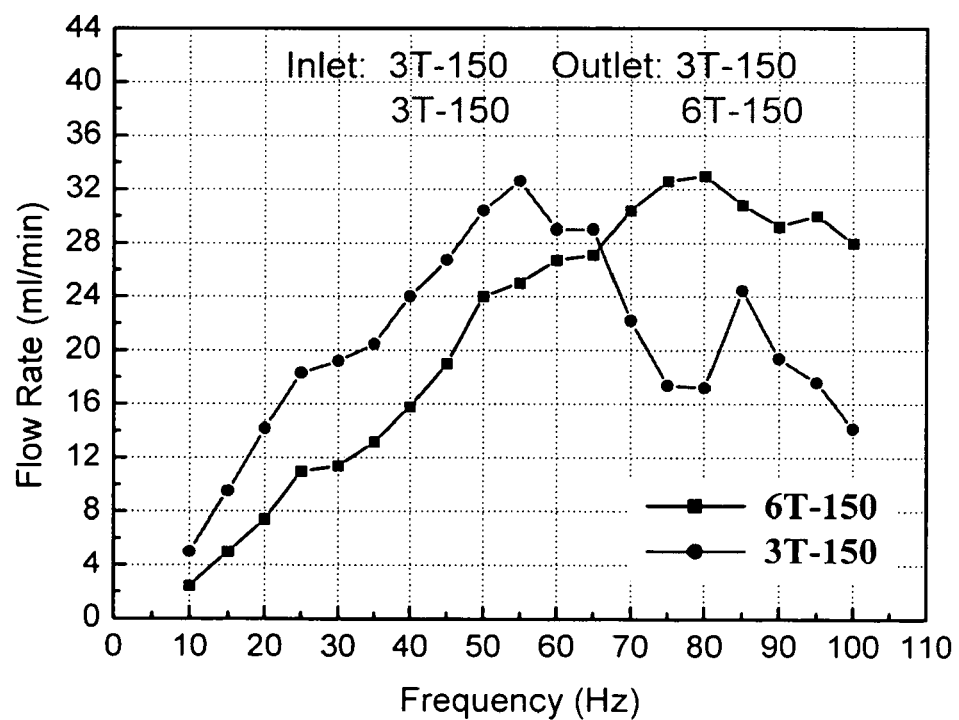
Figure 12A:
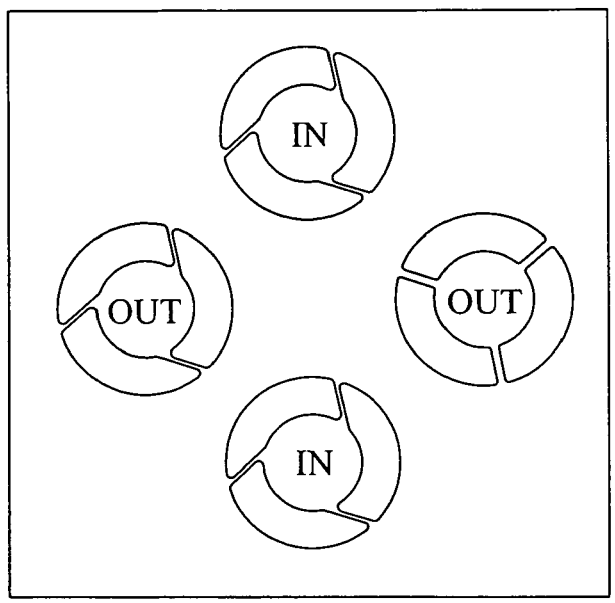
Figure 12B:
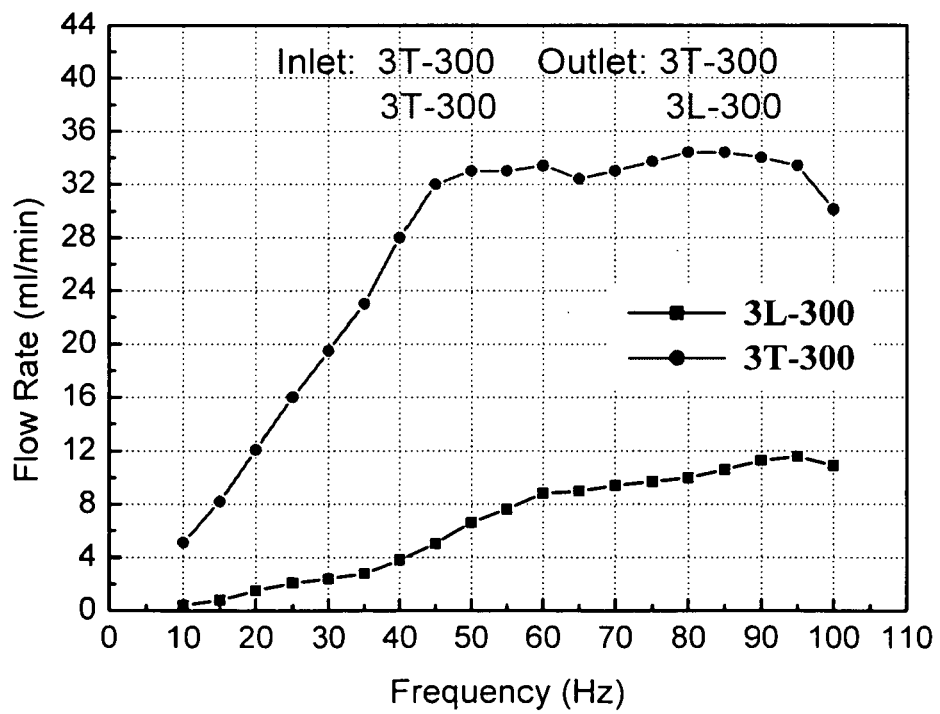
Figure 13A:
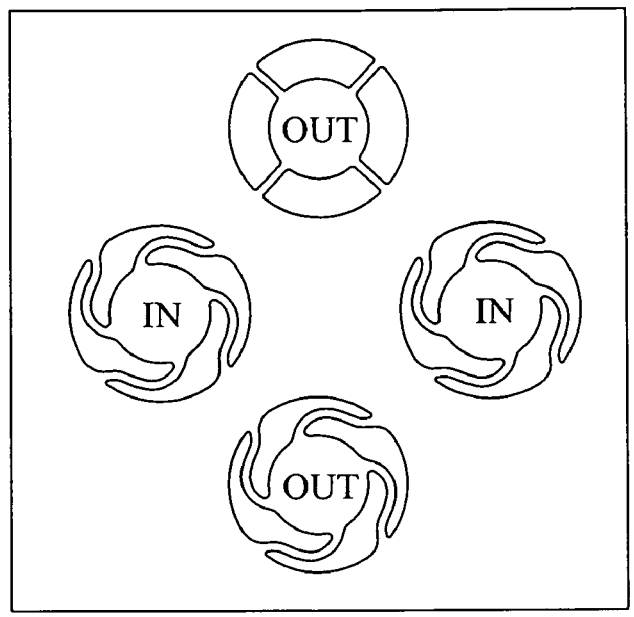
Figure 13B:
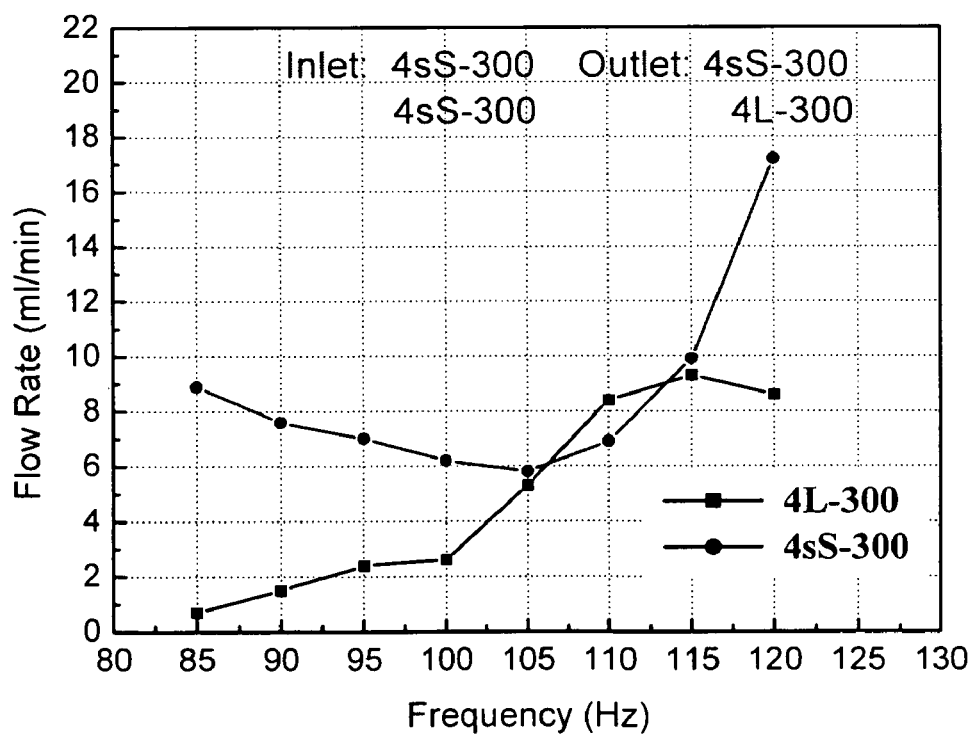
Figure 14A:
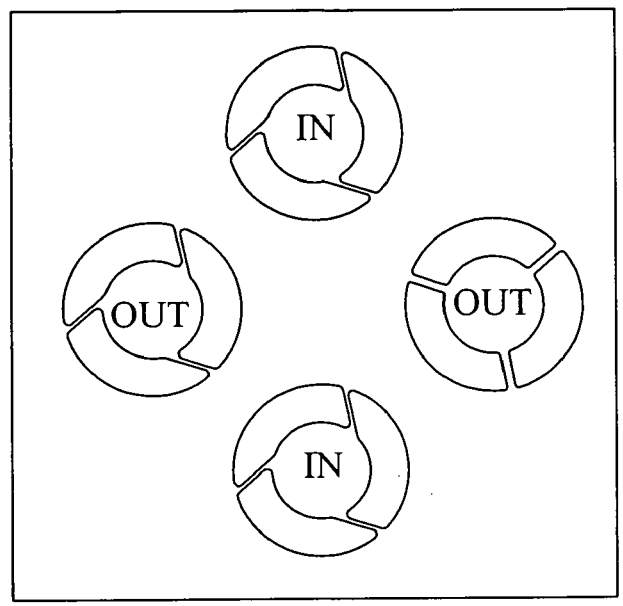
Figure 14B:
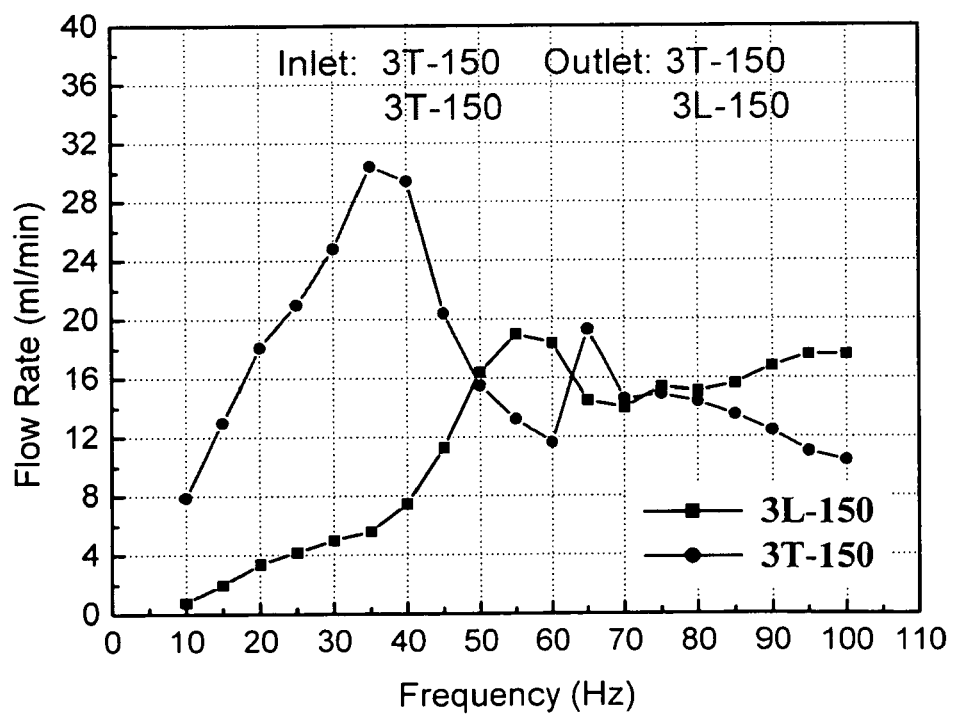
Figure 15A:
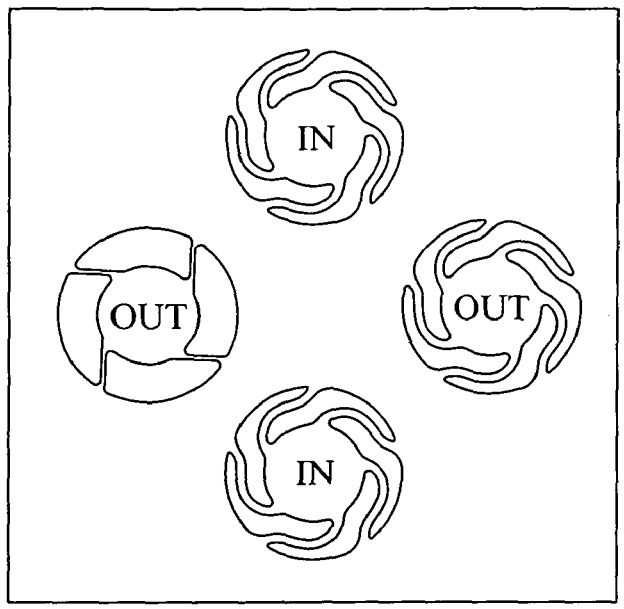
Figure 15B:
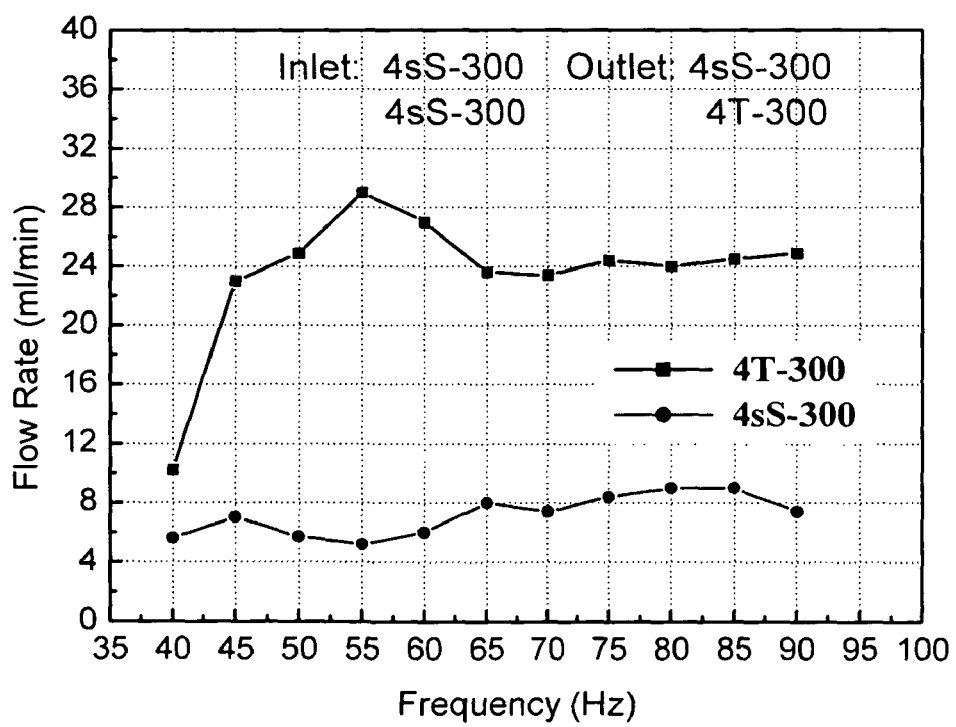
Figure 16A:
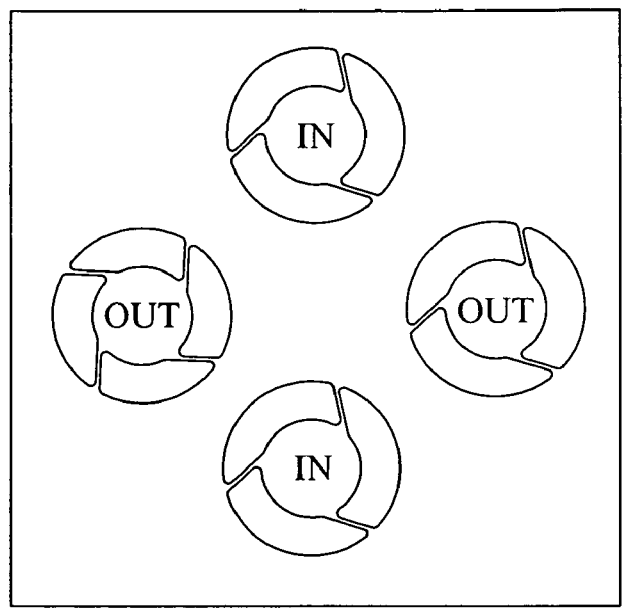
Figure 16B:
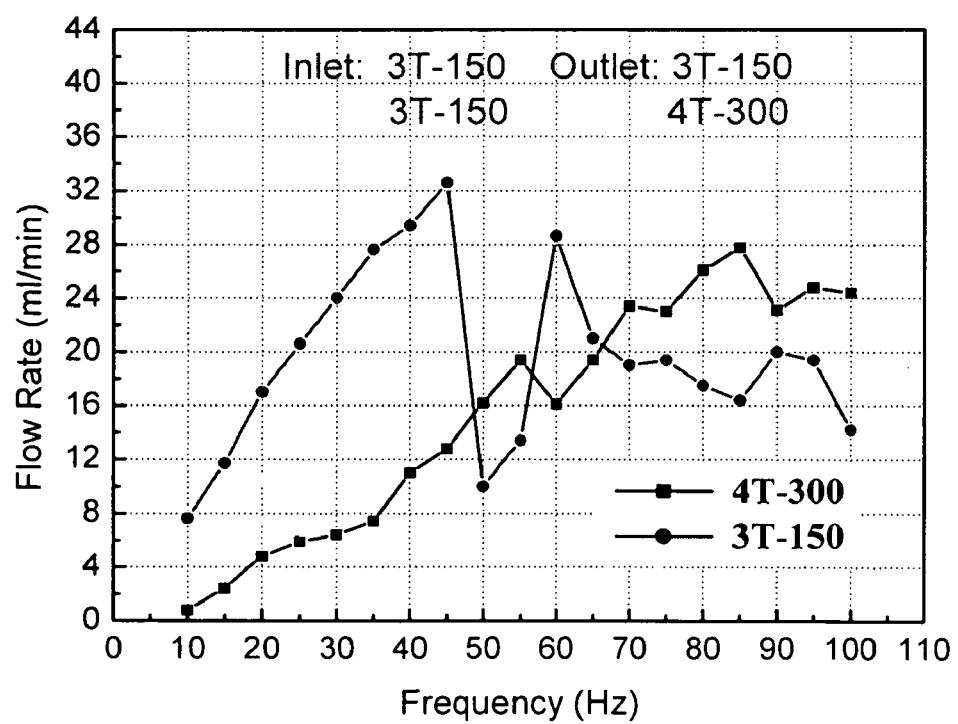
Figure 17A:
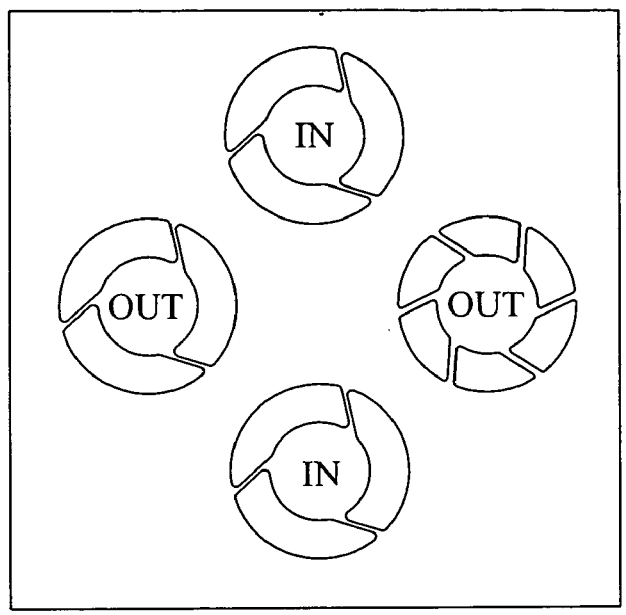
Figure 17B:
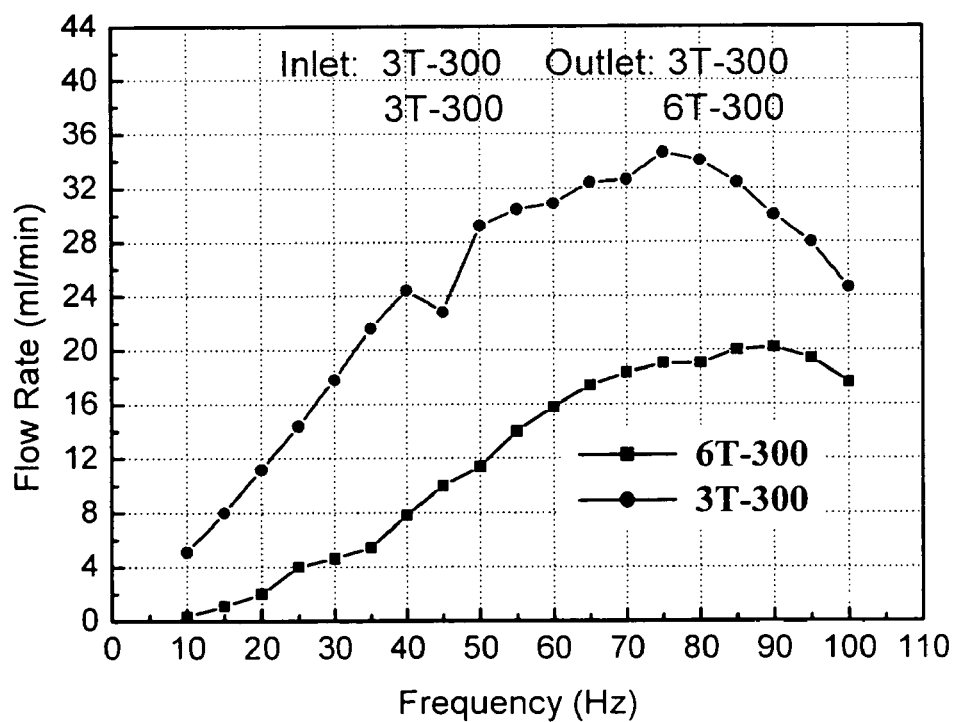
Figure 18A:
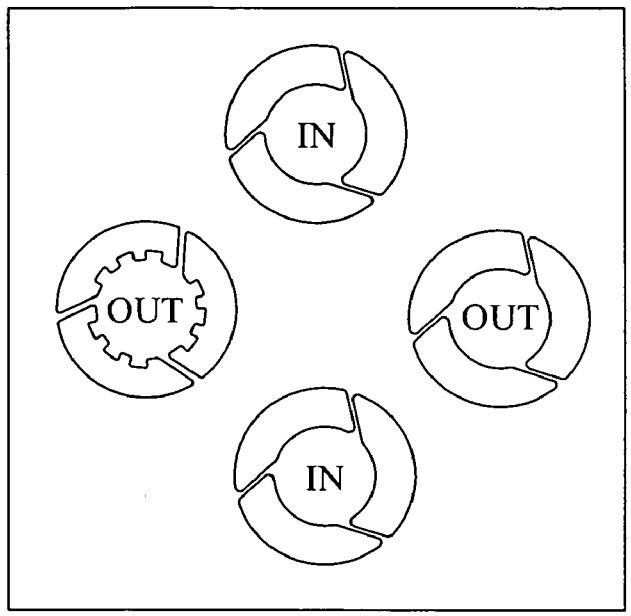
Figure 18B:
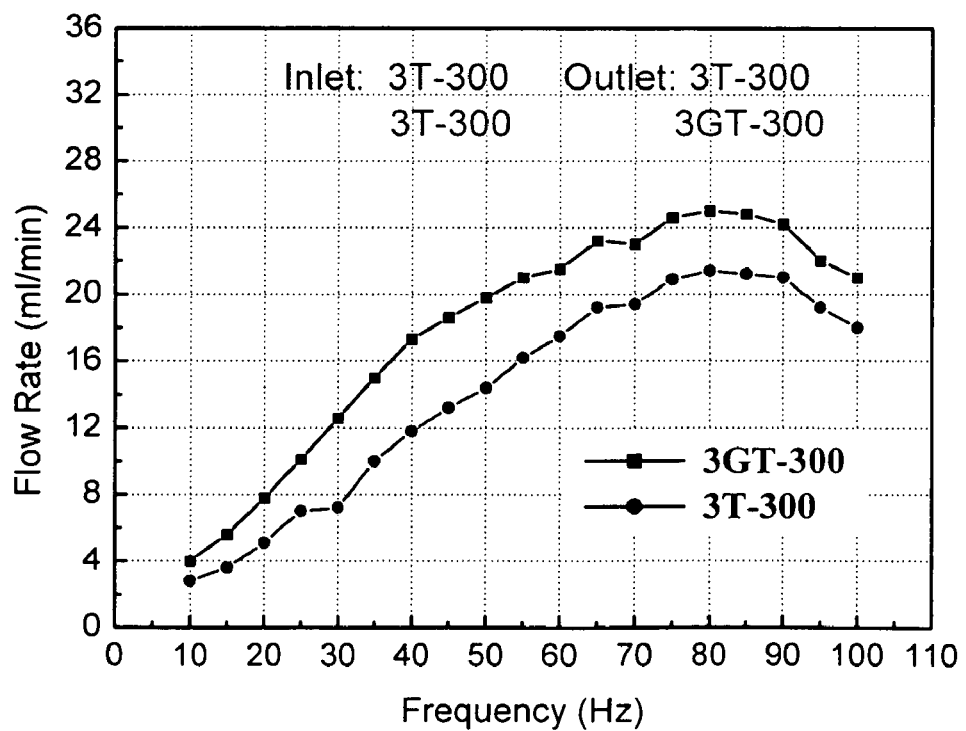

According to the present invention, layout for the inlet valve structures 231a, 231b and the outlet valve structures 232a, 232b of the valve membrane 23 may be modified to several embodiments so as to meet the requirements for mixing and/or distributing various fluids. Referring to FIGS. 5(a) to (e), schematic views illustrating modifications of valve membranes according to the present invention, an option may be given to a valve membrane being arranged with a two-inlet-and-two-outlet mixing and distributing valve structure, as shown in FIG. 5(a); a valve membrane being arranged with a three-inlet-and-one-outlet mixing valve structure, as shown in FIG. 5(b); a valve membrane being arranged with a one-inlet-and-three-outlet distributing valve structure, as shown in FIG. 5(c); a valve membrane being arranged with a one-inlet-and-four-outlet distributing valve structure, as shown in FIG. 5(d); or a valve membrane being arranged with a four-inlet-and-one-outlet mixing valve structure, as shown in FIG. 5(e). However, it is understood that there is no intention to limit the layout for the inlet valve structures and the outlet valve structures of the valve membrane. In other words, so long as the layout for the inlet valve structures and the outlet valve structures can achieve the purpose of mixing and/or distributing fluids during conveyance thereof, such layout should be considered within the scope of the present invention.

Further, according to the present invention, the inlet valve structures 231a, 231b and the outlet valve structures 232a, 232b are not to be limited to the structures shown in FIGS. 2(a) and (d), but instead, the valve structures of the same thickness and materials, though rigidity of the valve structures is different, will be adopted. The rigidity of the valve structures is determined by the configuration thereof, and by the width and number of the valve arms 2311a, 2311b and 2321a, 2321b, and together with incorporating the vibration frequency of the actuating device, the ratio in distributing or mixing the fluid can be adjusted. References may be made to FIGS. 6(a) to (e), schematic views illustrating modifications of the inlet valve structures and the outlet valve structures of the valve membrane according to the present invention. As shown in FIG. 6(a), the valve structure 61 includes a valve blade 611, openings 612 surrounding the valve blade 611, and valve arms 613 located between the openings 612 and in connection with the valve blade 611. In the present embodiment, the valve blade 611 has a circular structure, the number of the openings 612 is three, and the number of the valve arms 613 is three, where the valve arms 613 each has a "tangent" configuration. However, it is not indented to limit the shape of the valve blade 611, and the number and shape of the openings 612 and of the valve arms 613.

Now referring to FIG. 6(b), the valve structure 62 includes a valve blade 621, openings 622 surrounding the valve blade 621, and valve arms 623 located between the openings 622 and in connection with the valve blade 621. In the present embodiment, the valve blade 621 has a circular structure, the number of the openings 622 is four, and the number of the valve arms 623 is four, where the valve arms 623 each has a "linear" configuration. However, it is not indented to limit the shape of the valve blade 621, and the number and shape of the openings 622 and of the valve arms 623.

As shown in FIG. 6(c), the valve structure 63 includes a valve blade 631, openings 632, and valve arms 633, whereas the connecting relations among the valve blade 631, the openings 632, and the valve arms 633 are similar to those of the above-mentioned embodiments, and thus no further description therefor is necessary. In this embodiment, the valve blade 631 has a circular structure, the number of the openings 632 is four, and the number of the valve arms 633 is four, where the valve arms 633 each has a substantially long "S-shaped" configuration. However, it is not indented to limit the shape of the valve blade 631, and the number and shape of the openings 632 and of the valve arms 633.

Referring to FIG. 6(d), the valve structure 64 includes a valve blade 641, openings 642, and valve arms 643, whereas the connecting relations among the valve blade 641, the openings 642, and the valve arms 643 are similar to those of the above-mentioned embodiments, and thus no further description therefor is necessary. In this embodiment, the valve blade 641 has a circular structure, the number of the openings 642 is five, and the number of the valve arms 643 is five, where the valve arms 643 each has a substantially short "S-shaped" configuration. However, it is not indented to limit the shape of the valve blade 641, and the number and shape of the openings 642 and of the valve arms 643.

Further, referring to FIG. 6(e), the valve structure 65 includes a valve blade 651, openings 652, and valve arms 653, whereas the connecting relations among the valve blade 651, the openings 652, and the valve arms 653 are similar to those of the above-mentioned embodiments, and thus no further description therefor is necessary. In this embodiment, the valve blade 651 has a circle-like structure with teeth 6511 on the periphery thereof, the number of the openings 652 is three, and the number of the valve arms 653 is three, where the valve arms 653 each has a "tangent" configuration. However, it is not indented to limit the shape of the valve blade 651, and the number and shape of the openings 652 and of the valve arms 653.

It should be noted that the valve structures applied to the valve membrane of the multi-channel fluid conveying apparatus 20, according to the present invention, are not limited to the configurations disclosed in FIGS. 6(a) to (e), but instead, so long as modifications for the valve structures with the same thickness and material and with different rigidity, such modifications should be considered within the scope of the present invention.

In view of the modifications of the valve structures of the valve membrane shown in FIGS. 6(a) to (e), it is understood that using valve structure assembly of various rigidity, fluid mixture of different proportions can be achieved, due to different flexibility of the valve structures making various extension of openness thereof under the same cabinet pressure. Further, through appropriate layout of the fluid channels and of the inlet and outlet valve structures, the fluid can be distributed to different containers. The proportion of the fluid to be distributed can be carried out by the above-mentioned valve structures of different rigidity.

Figure 1:
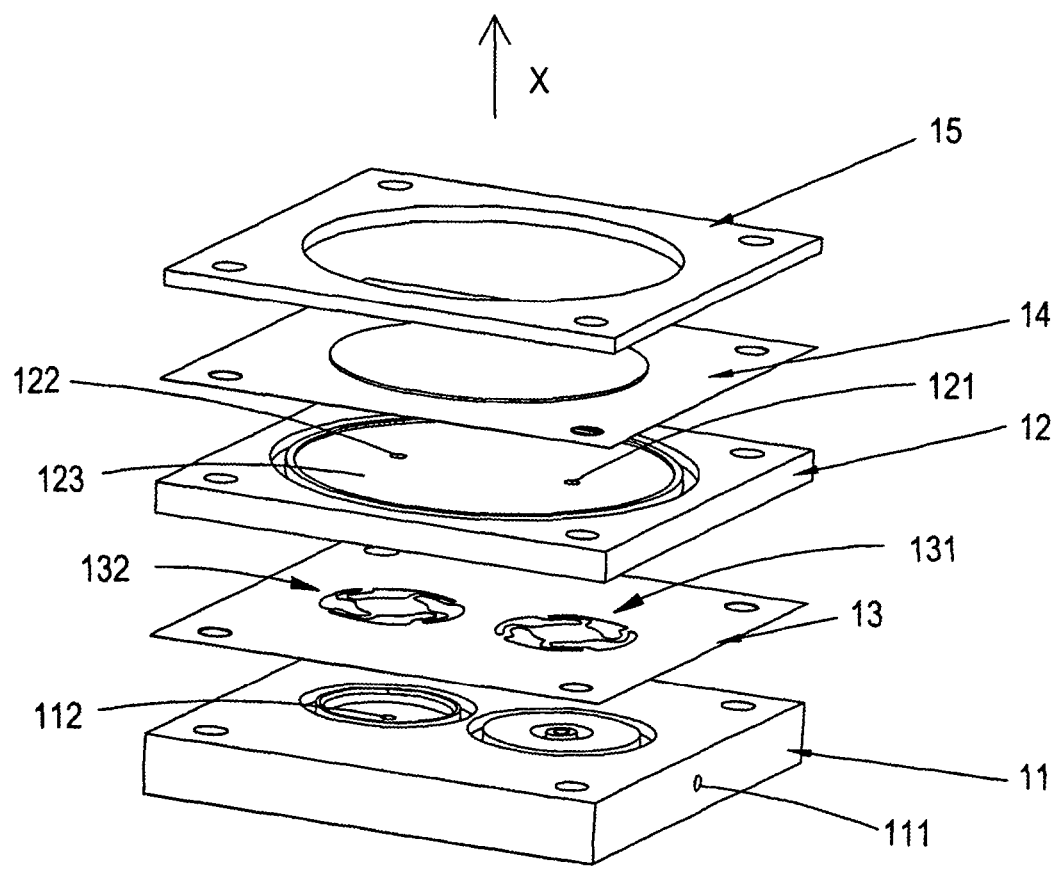
FIG. 1 is an exploded view illustrating a conventional micropump structure.
Figure 20:
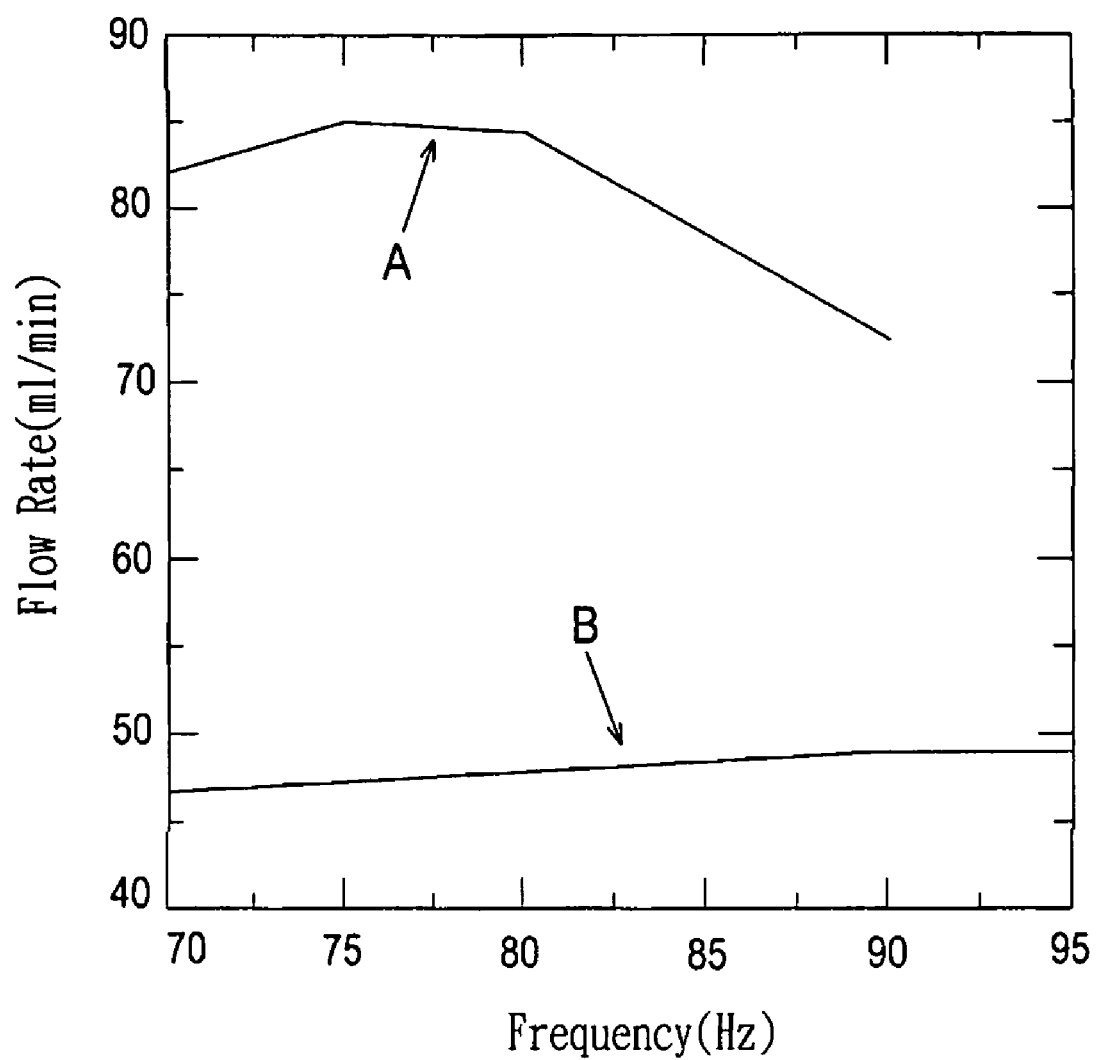
FIG. 20 is a graphic view illustrating flow rate data compared between the single one pressure chamber incorporating a one-inlet-and-one-outlet valve structure, as shown in FIG. 1, according to the conventional art and the single one pressure chamber incorporating plural inlet and outlet valve structures, as shown in FIG. 2(a), according to the present invention.

Now referring to FIG. 20, a graphic view illustrating flow rate data compared between the single one pressure chamber incorporating a one-in-and-one-out valve structure, as shown in FIG. 1, according to the conventional art and the single one pressure chamber incorporating plural inlet and outlet valve structures, as shown in FIG. 2(a), according to the present invention, the flow rate data were taken from an experiment embodying the valve structures shown in FIG. 6(d), where a driving voltage for the actuating device is 250 Vpp, the diameter of the actuating device (PZT diameter) is 22 mm, the thickness of the actuating device (PZT thickness) is 0.20 mm, the diaphragm thickness is 0.15 mm, the valve structure thickness is 0.025 mm, the valve arm width is 0.4 mm. As shown in FIG. 20, arrow A indicates the flow rate obtained from the single one pressure chamber incorporating plural inlet and outlet valve structures, as shown in FIG. 2(a), according to the multi-channel fluid conveying apparatus of the present invention, and arrow B indicates the flow rate obtained from the single one pressure chamber incorporating a one-in-and-one-out valve structure, as shown in FIG. 1, according to the micropump of the conventional art. It is noted that under the same frequency (Hz), the multi-channel fluid conveying apparatus of the present invention can indeed increase a great extent of flow rate, as compared with the conventional art.

Further, referring to FIGS. 7(a), 8(a), 9(a), 10(a), 11(a), 12(a), 13(a), 14(a), 15(a), 16(a), 17(a) and 18(a), schematic views illustrating the valve membrane incorporating a plurality of valve structures, with various rigidity, according to the present invention, the valve membrane, as shown in each figure, is provided with two inlet valve structure of the same proportional rigidity incorporating two outlet valve structures of different proportional rigidity. Still further, referring to FIGS. 7(b), 8(b), 9(b), 10(b), 11(b), 12(b), 13(b), 14(b), 15(b), 16(b), 17(b) and 18(b), graphic views illustrating flow ratio data obtained from experiments each made on the two outlet valve structures of different proportional rigidity, as shown in FIG. 7(a), 8(a), 9(a), 10(a), 11(a), 12(a), 13(a), 14(a), 15(a), 16(a), 17(a) or 18(a), the valve membrane provided with the two inlet valve structure of the same proportional rigidity incorporating the two outlet valve structures of different proportional rigidity, as an arrangement for distributing the fluid, can discharge different flow rates of fluid because the rigidity of the outlet valve structures differs from each other, so long as frequency of the actuating device is changed. This makes the multi-channel fluid conveying apparatus 20, according to the present invention, can achieve the function of distributing fluid in different proportions.

On the other hand, the valve membrane may be arranged with two outlet valve structure of the same proportional rigidity incorporating two inlet valve structures of different proportional rigidity. As such, the multi-channel fluid conveying apparatus 20, according to the present invention, can proceed with mixing two different fluids of different proportions.

Figure 19:
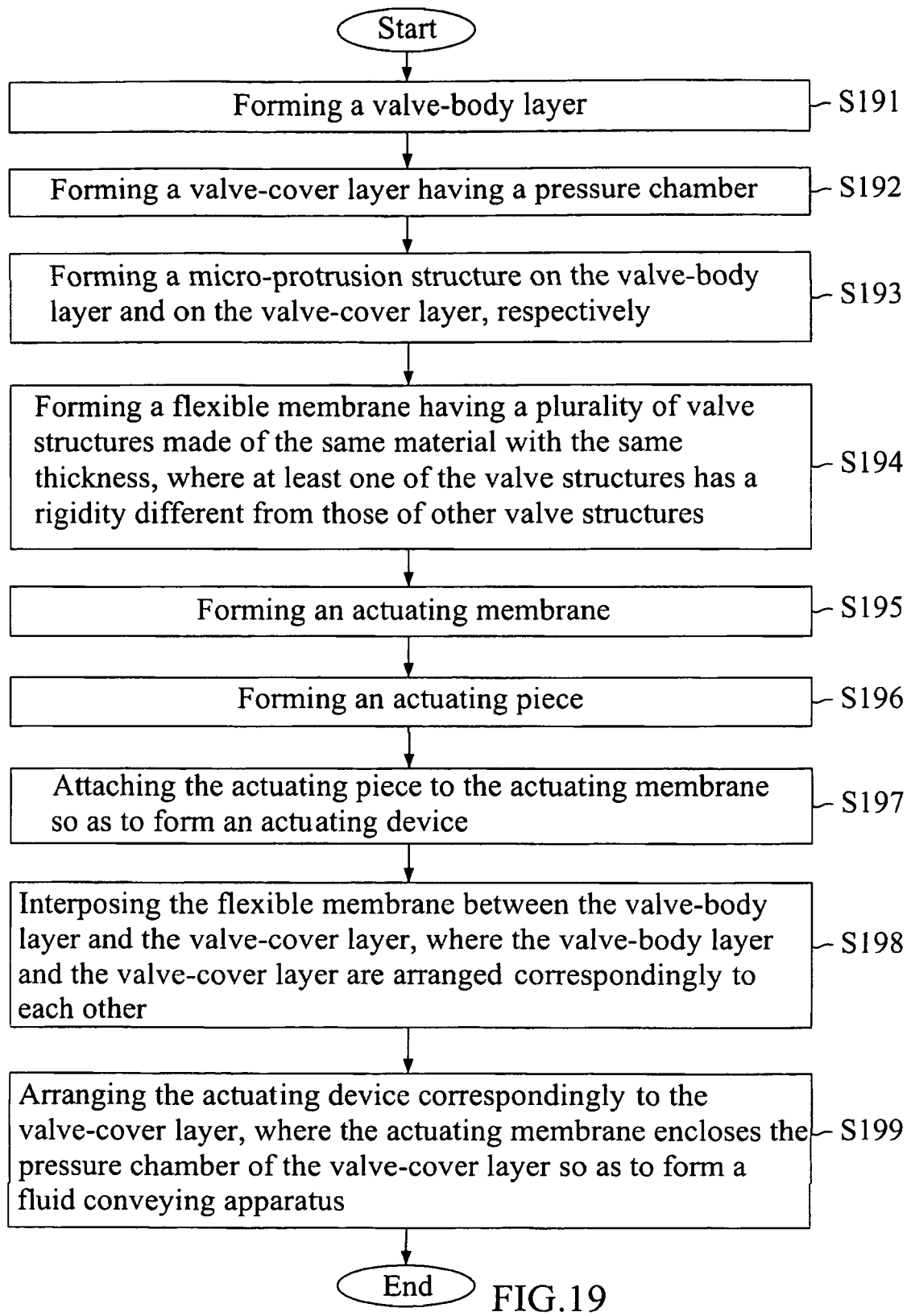
FIG. 19 is a flow chart illustrating steps for manufacturing the multi-channel fluid conveying apparatus according to the present invention.

Now referring to FIG. 19, a flow chart illustrating steps for manufacturing the multi-channel fluid conveying apparatus according to the present invention, the steps comprise the following: First, to form a valve-body layer (i.e. the valve seat 21) (step S191); Then to form a valve-cover layer, where, according to the present invention, the valve-cover layer refers to the valve cover 22, as shown in FIG. 2(a), having a pressure chamber 225 (step S192); Further, to form a micro-protrusion structure on the valve-body layer and on the valve-cover layer, respectively (step S193). There are two measures, but not limited, for forming the micro-protrusion structure, namely, as shown in FIG. 2(a), FIG. 3(a), and FIG. 4(a), to form at least one recess, respectively, on the valve seat 21 and on the valve cover 22, where the valve seat 21 is provided with recesses 216a, 216b, and the recesses 216a, 216b each receives a sealing ring 26, such that the sealing rings 26, received in the recesses 216a, 216b, can partly be protruded from a surface of the valve seat 21, and that a micro-protrusion structure can therefore be formed on the surface of the valve seat 21. Similarly, the recesses 228a, 228b and the sealing rings 27 can be employed on the valve cover 22 to form a micro-protrusion structure on the under surface 221. Secondly, a semi-conductor manufacturing process may be adopted, such as, but not limited, a yellow-light etching or a film coating or an electroforming, so that a micro-protrusion structure can be formed directly on the valve seat 212 and on the valve cover 22.

Thereafter, to form a flexible membrane having a plurality of valve structures made of the same material with the same thickness, where at least one of the valve structures has a rigidity different from those of other valve structures. These turn out to be the valve membrane 23 and the inlet and outlet valve structures (step S194). Then to form an actuating membrane (i.e. the diaphragm 241) (step S195), and so an actuating piece (i.e. the actuator 242) (step S196). The actuating piece (actuator 242) is attached to the actuating membrane (diaphragm 241) so as to form an actuating device 24, and to correspondingly arrange the actuator 242 and the pressure chamber 225 (step S197). Thereafter, interposing the flexible membrane (valve membrane 23) between the valve-body layer (valve seat 21) and the valve-cover layer (valve cover 22), where the valve-body layer (valve seat 21) and the valve-cover layer (valve cover 22) are arranged correspondingly to each other (step S198). Eventually, arranging the actuating device 24 correspondingly to the valve-cover layer (valve cover 22), where the actuating membrane (valve membrane 23) encloses the pressure chamber 225 of the valve-cover layer so as to form a fluid conveying apparatus (step S199).

Given the above, the multi-channel fluid conveying apparatus 20, according to the present invention, is employed as a micropump structure, comprising the valve seat 21, the valve membrane 23, the valve cover 22, the diaphragm 241 and the actuator 242, which are stacked up with one another. According to the present invention, the one single pressure chamber and the actuator are arranged to incorporate plural flow channels and plural inlet and outlet valve structures, so as to greatly increase flow rate and lift of the fluid, and to meet the occasion of application where a higher flow rate and lift of fluid are required, though the whole dimension of the multi-channel fluid conveying apparatus, according to the present invention, is not be increased.

Moreover, in the present invention, the valve membrane is provided with a plurality of valve structures made of the same material with the same thickness, where at least one of the valve structures has a rigidity different from those of other valve structures. Through the use of valve structure assembly of various rigidity, fluid mixture of different proportions can be achieved, due to different flexibility of the valve structures making various extension of openness thereof under the same cabinet pressure. Further, through appropriate layout of the fluid channels and of the valve structures, the fluid can be distributed to different containers. The proportion of the fluid to be distributed can be carried out by the above-mentioned valve structures of different rigidity. It is understood, therefore, that the multi-channel fluid conveying apparatus, according to the present invention, is useful and industrially practicable.

Although the present invention has been explained in relation to its preferred embodiments, it is to be understood that many other possible modifications and variations can be made without departing from the scope of the invention as hereinafter claimed.

What is claimed is:

1. A multi-channel fluid conveying apparatus, for delivering a fluid, comprising:
    a valve seat, including at least one inlet channel and at least one outlet channel;
    a valve cover, being arranged on the valve seat;
    a valve membrane, being interposed between the valve seat and the valve cover, and including a plurality of valve structures made of the same material with the same thickness, wherein at least one of the valve structures has a rigidity different from those of other valve structures;
    a plurality of temporary-deposit chambers, being interposed between the valve membrane and the valve cover and between the valve membrane and the valve seat; and
    an actuating device, having a periphery fixed to the valve cover.

2. The multi-channel fluid conveying apparatus as claimed in claim 1, wherein the plurality of valve structures of the valve membrane each includes a valve blade, a plurality of vents, and a plurality of valve arms, and wherein the plurality of vents are arranged around the periphery of the valve blade, and the plurality of valve arms are in connection with the valve blade and are arranged among the vents.

3. The multi-channel fluid conveying apparatus as claimed in claim 2, wherein the valve blade has a substantially circle-like structure.

4. The multi-channel fluid conveying apparatus as claimed in claim 2, wherein the valve arms each has a tangent configuration.

5. The multi-channel fluid conveying apparatus as claimed in claim 2, wherein the valve arms each has a substantially S-shaped configuration.

6. The multi-channel fluid conveying apparatus as claimed in claim 2, wherein the rigidity of the valve structures is determined by the configuration thereof.

7. The multi-channel fluid conveying apparatus as claimed in claim 1, wherein by incorporating the vibration frequency of the actuating device, the valve structures can adjust the ratio in distributing or mixing the fluid.

8. The multi-channel fluid conveying apparatus as claimed in claim 1, wherein at least one first temporary-deposit chamber is formed between the valve membrane and the valve cover, and at least one second temporary-deposit chamber is formed between the valve membrane and the valve seat.

9. The multi-channel fluid conveying apparatus as claimed in claim 1, wherein the plurality of valve structures of the valve membrane include at least one inlet valve structure and at least one outlet valve structure.

10. The multi-channel fluid conveying apparatus as claimed in claim 9, wherein the valve membrane is arranged with a two-inlet-and-two-outlet mixing and distributing valve structure.

11. The multi-channel fluid conveying apparatus as claimed in claim 9, wherein the valve membrane is arranged with a three-inlet-and-one-outlet mixing valve structure.

12. The multi-channel fluid conveying apparatus as claimed in claim 9, wherein the valve membrane is arranged with a one-inlet-and-three-outlet distributing valve structure.

13. The multi-channel fluid conveying apparatus as claimed in claim 9 wherein the valve membrane is arranged with a one-inlet-and-four-outlet distributing valve structure.

14. The multi-channel fluid conveying apparatus as claimed in claim 9, wherein the valve membrane is arranged with a four-inlet-and-one-outlet mixing valve structure.

15. A multi-channel fluid conveying apparatus, for delivering a fluid, comprising:

- a valve seat, including at least one inlet channel and at least one outlet channel;
- a valve cover, being stacked up with the valve seat;
- a valve membrane, being interposed between the valve seat and the valve cover, and including at least two valve structures made of the same material with the same thickness;
- a plurality of temporary-deposit chambers, being interposed between the valve membrane and the valve cover and between the valve membrane and the valve seat; and
- an actuating device, having a periphery fixed to the valve cover.

* * * * *